United States Patent [19]
Durham, III

[11] Patent Number: 6,087,654
[45] Date of Patent: *Jul. 11, 2000

[54] ENCODER APPARATUS AND METHODS

[75] Inventor: Ormonde G. Durham, III, Van Hornesville, N.Y.

[73] Assignee: Opto Generic Devices, Inc., Van Hornesville, N.Y.

[*] Notice: This patent is subject to a terminal disclaimer.

[21] Appl. No.: 08/926,768

[22] Filed: Sep. 8, 1997

Related U.S. Application Data

[63] Continuation-in-part of application No. 08/711,629, Sep. 5, 1996, which is a continuation-in-part of application No. 08/394,473, Feb. 27, 1995.

[51] Int. Cl.$^7$ ................................................ G01D 5/34
[52] U.S. Cl. ............................ 250/231.13; 250/231.16; 318/439
[58] Field of Search ................... 250/231.13, 231.16, 250/233, 237 G, 237 R, 570; 318/602, 68, 430, 439

[56] References Cited

U.S. PATENT DOCUMENTS

| | | | |
|---|---|---|---|
| 3,193,744 | 7/1965 | Seward | 318/18 |
| 3,634,672 | 1/1972 | Weatherred | 235/193.5 |
| 3,728,551 | 4/1973 | Culver et al. | 250/231 SE |
| 3,757,128 | 9/1973 | Vermeulen | 250/231 SE |
| 4,008,425 | 2/1977 | Dickey | 318/314 |
| 4,158,800 | 6/1979 | Jahelka et al. | 318/685 |
| 4,160,200 | 7/1979 | Imamura et al. | 318/616 |
| 4,190,793 | 2/1980 | Parker et al. | 318/800 |
| 4,224,515 | 9/1980 | Terrell | 250/231 |
| 4,225,787 | 9/1980 | Shapiro et al. | 250/406 |
| 4,227,137 | 10/1980 | Hartman | 318/801 |
| 4,286,203 | 8/1981 | Ehret | 318/801 |
| 4,353,016 | 10/1982 | Born | 318/254 |
| 4,417,141 | 11/1983 | Phillips | 250/231.14 |
| 4,429,267 | 1/1984 | Veale | 318/594 |
| 4,438,376 | 3/1984 | Varnovitsky | 318/78 |
| 4,588,936 | 5/1986 | Itoh et al. | 318/594 |
| 4,599,547 | 7/1986 | Ho | 318/594 |
| 4,689,540 | 8/1987 | Tani et al. | 318/608 |
| 4,717,864 | 1/1988 | Fultz | 318/254 |
| 4,736,140 | 4/1988 | Ernst | 318/77 |
| 4,795,901 | 1/1989 | Kitazawa | 250/231.16 |
| 4,833,316 | 5/1989 | Yoneda | 250/231 SE |
| 4,864,300 | 9/1989 | Zaremba | 341/6 |
| 4,882,524 | 11/1989 | Lee | 318/254 |
| 4,902,885 | 2/1990 | Kojima et al. | 250/211 K |
| 5,103,225 | 4/1992 | Dolan et al. | 341/13 |
| 5,172,039 | 12/1992 | Owens | 318/489 |
| 5,177,393 | 1/1993 | Webber | 310/68 B |
| 5,198,738 | 3/1993 | Blaser et al. | 318/652 |
| 5,250,884 | 10/1993 | Okumura | 318/560 |
| 5,665,965 | 9/1997 | Durham, III | 250/231.13 |

FOREIGN PATENT DOCUMENTS 5791683   6/1982   Japan .

*Primary Examiner*—Que T. Le
*Assistant Examiner*—Thanh X. Luu
*Attorney, Agent, or Firm*—Trapani & Molldrem

[57] ABSTRACT

Apparatus and method for producing a resultant output signal from at least two output signals generated by an encoder. The apparatus and methods include: (a) generating a first output signal from the encoder; (b) generating a second output signal from the encoder; (c) applying the first output signal to the second output signal to produce the resultant output signal, wherein the resultant output signal includes a resultant number of waveform cycles per mechanical cycle of the encoder, and wherein the resultant number of waveform cycles is determined by the waveform cycles of the first and second output signals. Another apparatus and method involves varying the output of at least one emitter in response to an output signal of the encoder, to generate a particular resultant or application signal. A further apparatus and method involves varying the output characteristic of at least one photo-detector in response to an output signal of the encoder, to generate a particular resultant or application signal.

69 Claims, 15 Drawing Sheets

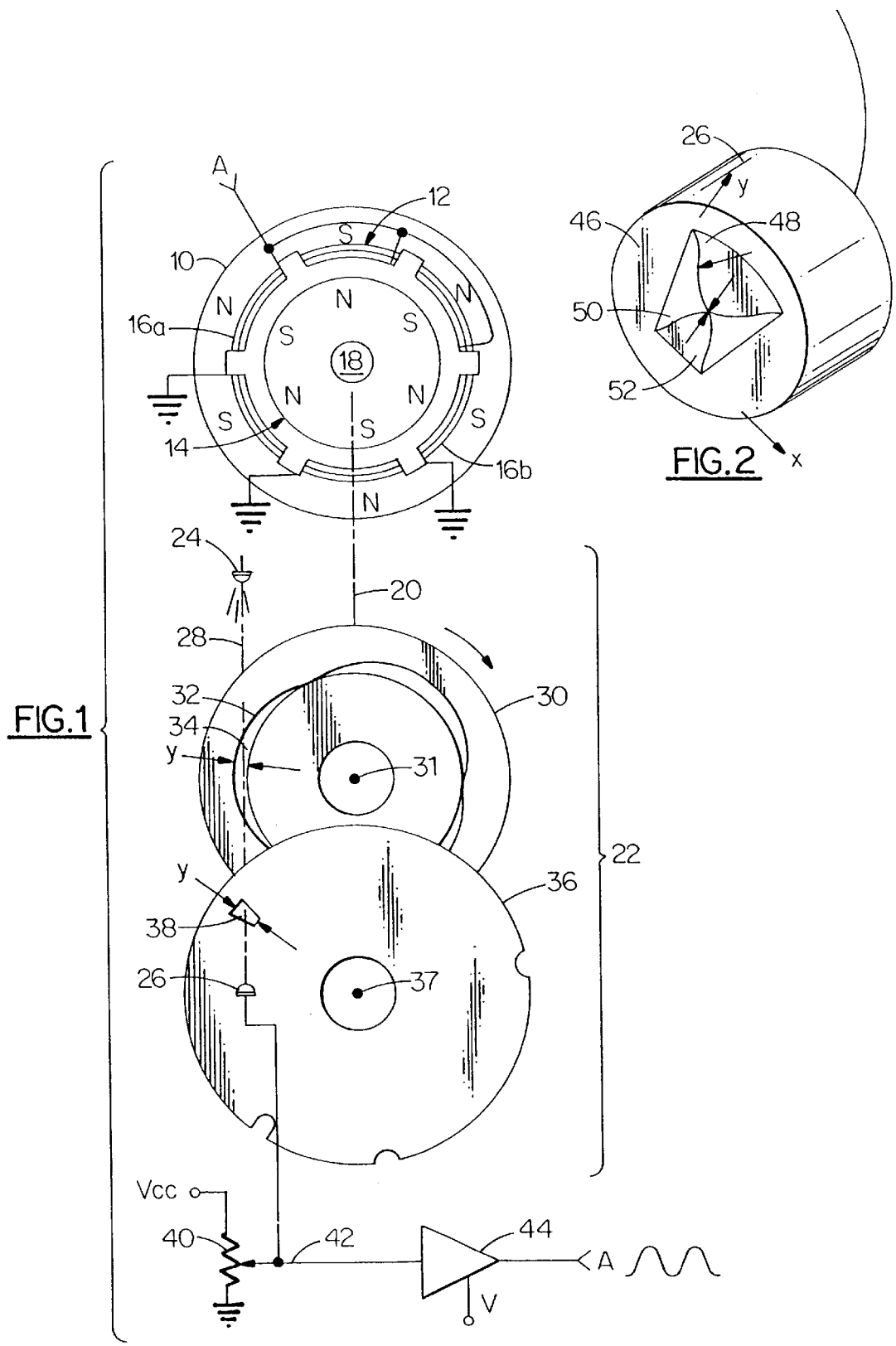

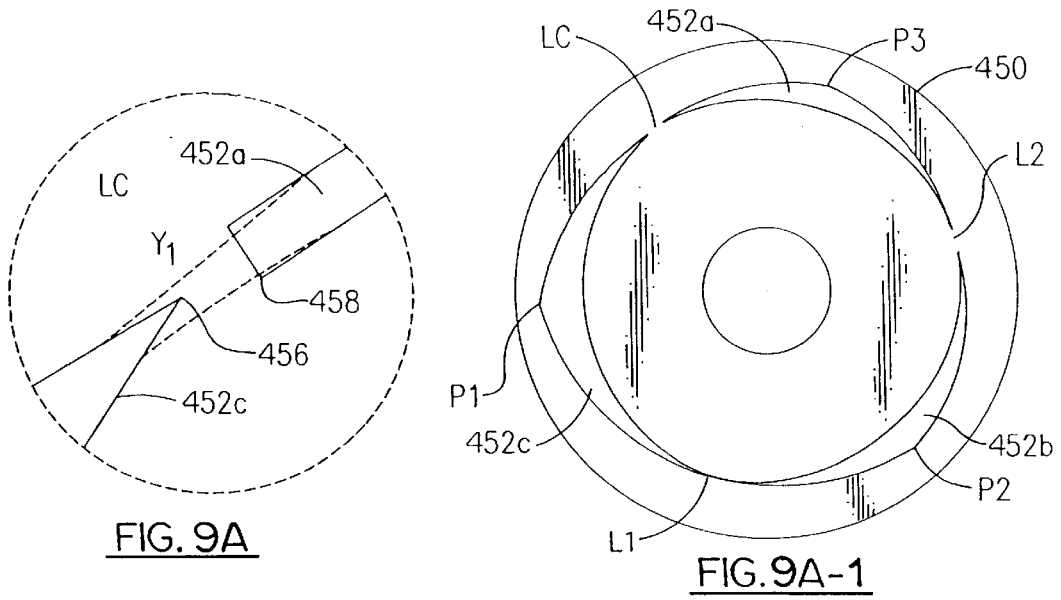
FIG. 9A
FIG. 9A-1
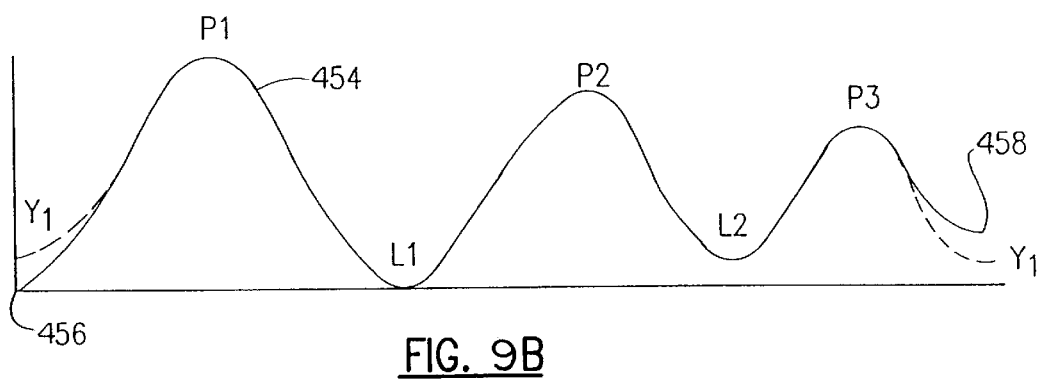
FIG. 9B
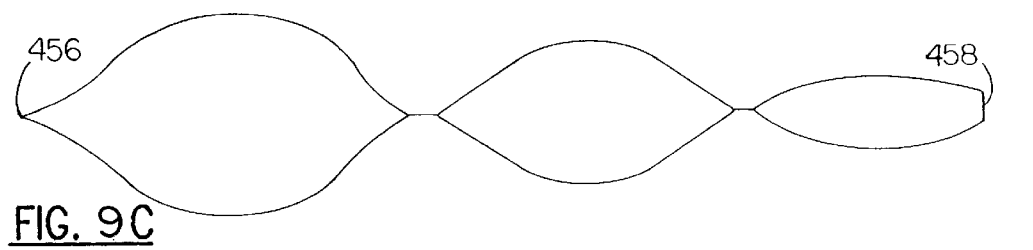
FIG. 9C
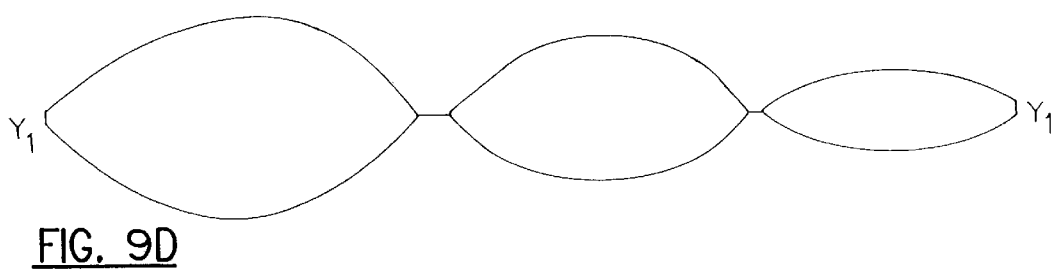
FIG. 9D

ENCODER APPARATUS AND METHODS

CROSS-REFERENCES TO RELATED APPLICATIONS

This is a continuation-in-part of application Ser. No. 08/711,629, filed Sep. 5, 1996, which is a continuation-in-part of application Ser. No. 08/394,473, filed Feb. 27, 1995.

BACKGROUND OF THE INVENTION

1. Technical Field

The present invention relates generally to encoder apparatus and methods, and, more particularly to encoder apparatus and methods for converting the cyclic motion of an electro-mechanical machine into meaningful electrical signals which can be used in a number of applications. One such application involves direct commutation of the electro-mechanical machine from which the encoder generated the electrical signal. An important field of such apparatus and methods concerns the control of electric motor operation.

2. Background Art

The most relevant background art to the present invention is found in the field of electric motor control and commutation. However, it is to be understood that the present invention is not limited to this field. Since the most important application of the present invention relates to the control of electric motor operation, the following discussion will relate primarily to this field.

In addition, most of the current applications of the present invention involve optical encoder implementations. However, it is to be understood that the present invention is not so limited. Since most current applications of the present invention concern optical encoding, the following disclosure will primarily address optical encoding and optical encoder embodiments.

The present invention may be implemented as a simple variable speed control device and method for A.C. motors which can additionally improve or enhance the motor's normal operating efficiencies. This implementation involves direct optical-to-electrical commutation of single and multi-phase A.C. induction motors, but also can be adapted for other A.C. and brushless D.C. motors.

Generally, commutation for A.C. induction motors involves using the A.C. power frequency to provide an induced current in the appropriate stator windings, creating a magnetic flux which, in turn, induces a current and resulting magnetic flux in the armature windings. When properly synchronized or matched, a torque or force is created between the two fluxes which causes the armature to move.

The motion of the armature, or motor speed, is directly proportional to the frequency of the input power at a specific voltage level. Normally A.C. motor input voltage and frequency are fixed, which in turn fixes the speed of the armature. In A.C. induction motors, a level of "frequency slip" is experienced between the stator and armature frequencies. That is, the speed of the armature is less than the speed of the stator's magnetic field. Control over the speed of the armature can be achieved by proper coordination of different frequencies, voltages, numbers of poles, numbers of windings or phases, amount of slip, etc.

Current methods of varying and controlling the speed of an A.C. motor (or brushless D.C. motor) usually involves some sort of motor-connected, speed sensing device that supplies feedback or input signals to a microprocessor, inverter or vector controller and driver, which are then analyzed, adjusted, varied, shaped, etc., to match frequency, voltage and power needs of the motor. The signal(s) from the microprocessor, inverter or vector drive, controls the frequency, power pulse widths, current and voltage amplitude(s), phasing(s) or various combinations of such parameters. These prior methods are generally complex, costly and cumbersome. They usually require a speed sensing input device or method, a separate analysis and control signal shaping unit, and a driver for power output, all of which must be properly connected and synchronized with each other.

The present invention differs from the above-mentioned methods by using a single device to sense, analyze and control speed as well as improve torque and power output, while using less energy. Similar to other methods, the present invention links motor speed to input power frequency and voltage, but accomplishes this link without most of the components used by other variable speed methods. The encoder of the present invention utilizes the novel concept of "optical programmability" to match, fit, profile and control, via direct commutation, the motor's speed, direction, slip, phasing, as well as improve torque and power while using less energy.

Others have disclosed methods of using optical encoders for D.C. electric motor commutation control. However, in these methods, the optical elements used—light emitters, detectors and encoder discs—could just as readily be resistive, magnetic or "electrically" varying elements. This is because these methods concern only one-dimensional optical "shuttering," i.e., merely diminishing and increasing light intensity, or blocking and unblocking the light path, to create either a sine wave or square wave output. Such waveforms could be similarly produced by non-optical elements.

The following patents disclose optical encoders employing a rotating encoder disc working in combination with a fixed disc, mask or reticle to produce a sinusoidal signal waveform: U.S. Pat. No. 3,193,744 to Seward; U.S. Pat. No. 4,160,200 to Imamura; U.S. Pat. No. 4,224,515 to Terrell; U.S. Pat. No. 4,429,267 to Veale; U.S. Pat. No. 4,599,547 to Ho; and U.S. Pat. No. 5,103,225 to Dolan et al. The following patents disclose the use of an optical encoder employing only an encoding disc or wheel, without a stationary mask or reticle, which produces square pulses for use in commutation and tachometer functions: U.S. Pat. No. 4,353,016 to Born; U.S. Pat. No. 4,882,524 to Lee; and U.S. Pat. No. 5,198,738 to Blaser et al. Finally, U.S. Pat. No. 5,177,393 to Webber discloses an optical encoder used for commutation of a D.C. brushless motor, employing a reflective encoder disc printed with a sinusoidal pattern.

All of the encoders disclosed in these patents are limited in that they cannot optically shape the waveform of the motor commutation signals to any desired form to optimize control of the motor's speed, direction, slip, phasing, torque and power output. In other words, they are not "optically programmable". In addition, many of the encoders proposed in these patents require additional commutation "control" components to produce square wave drive signals and match them to the poles and windings of the motor. Moreover, all of the above patented encoders depend on the physical placement, size, shape and interaction of all the optical elements. Finally, the encoders of these patents do not propose flexibility in design, or practical and affordable implementations.

The apparatus and methods of the present invention employ the optical encoder, itself, as an "optically programmable" device, which can directly sense, interpret and convert mechanical motion of a machine into programmed electrical signals that are compatible with the machine or with other control elements. The encoder is optically programmed, in that it implements a predetermined optical function and includes optical elements which can be graphically or geometrically shaped to represent almost any mathematical or algebraic waveform function. The encoder can produce at least one electrical signal having a predetermined waveform which is a transform of the optical function. Since the electrical signal is a direct result of the "cyclic" motion of the machine to which the encoder is coupled, it can be used to control (like a normal encoder), shape and enhance (like a microprocessor), modify and commutate (like a converter) and vary (like an amplifier). The term "cyclic," for the purposes of this application, is intended to include without limitation, recurring, repeating, periodic, rotating, reciprocating, and harmonic motion.

Optical programming includes the concept of "graphical programming". Graphical programming is the process of configuring encoder elements (e.g., an optical encoder disk) with graphically or geometrically shaped patterns or areas which are capable of being sensed during operation of the encoder. These graphically or geometrically shaped patterns or areas are defined by graphical functions (hereinafter described) which are, in turn, usually derived from mathematically or algebraically defined waveform functions (hereinafter described). In a preferred graphical programming procedure, the electrical signal to be created by the encoder is first specified. Then, a waveform function is determined and used to derive (e.g., by area-fill equations—described hereinbelow) a graphical function which, in turn, defines the graphically or geometrically shaped patterns or areas.

Graphical programming can be applied to any type of encoder in which the graphically shaped patterns or areas can be sensed. For example, capacitive encoders, such as those described in U.S. Pat. No. 5,172,039 to Owens and U.S. Pat. No. 4,864,300 to Zaremba, utilize conducting plates or patterns to produce variable capacitance between a rotating encoder element and a stationary encoder element. The variable capacitance is made part of an electrical circuit which produces the electrical signal output of the encoder. Such capacitive encoders could employ graphical programming, in that the stationary and rotating capacitive plates could be graphically or geometrically shaped. Such a capacitive embodiment would involve the multiplication of areas of at least two graphical or geometric shapes, co-defined by a graphical function. In another possible example, Hall Effect sensors may be used in combination with magnetic strips or patterns which are graphically or geometrically shaped.

It is the ability of the apparatus and methods of the present invention to create, shape, modify and control almost any mathematical or algebraic electronic output waveform pattern, via optical programming or graphical programming, that sets the present invention apart from methods and apparatus heretofore proposed.

3. Inventor's Perspective

My view, approach and perspective on encoders and encoding are very much analogous to electronics and electrical circuits. Specifically, I believe that optical encoding (OE) is at a similar threshold as integrated circuits (IC's) were for electronics some 30 to 40 years ago. IC's in many ways were merely repackaging of prior electronic circuits. This repackaging was initially nothing more than taking existing electronic circuits, components, etc. and integrating them into a single, smaller, more cost-effective usable device. However, that simple "repackaging" quickly evolved, and even revolutionized, not just the repackaging of existing circuits, but literally created new markets, industries, and electronic circuits. Many of such circuits were only conceptualized or mathematically represented prior to the IC, and in some cases not even conceived. Yet such circuits were made possible by this "repackaging" or consolidating into a single product approach.

I believe that my approach to encoding methods, specifically optical encoding, stands at a similar threshold. There are various optical encoding techniques in existence today, but the "repackaging" into a single or miniaturized cost-effective, compact product, as my generic approach does, affords similar scenarios of possibilities.

To further illustrate the analogy, I have now developed in a single OE package, an "optical programming" method that has given optical encoding new application possibilities never heretofore utilized or, in some cases, even envisioned by this "single product method".

Like the IC, in some cases, many of these applications already existed in other forms or with other multiple components. My method and approach has consolidated these into a singular product. However, as with IC's, I have also been able to reduce to practice concepts only heretofore mathematically represented, or which could never be affordably or practically constructed.

Further, I believe that I have likewise created and invented additional new concepts and applications never heretofore explored or contemplated prior to my new "IC approach". This "optical programmability" (op) that I have developed in connection with an optical encoder (OE) can be likened to a type of microprocessor (micro or $\mu$p), in that a micro is a unique series of electronic circuits, representing various capabilities, adaptability, and "programmability" oftentimes on a single IC chip.

I have likewise developed "programmability" or various application capabilities and processing abilities like a $\mu$p or micro, but consolidated into a single cohesive package (like an IC). It is this novel, unique concept of equating the encoder, optical encoding, optical programming, generic capability into one package, that makes my method analogous to the integrated circuit and micro. As the IC helped to evolve and create the micro which in turn opened up new concepts of electronic applications, and capability, and even industries, so may/should optical encoding and optical programmability.

It is thus my contention that the present invention and concept of optical encoding and optical programming stand where integrated circuits and microprocessors stood some 30 to 40 years ago. The extent and range of the capabilities, possibilities, products, and industries are only just now being slightly scratched by my approach.

It is this ubiquitous, generic expectation that I have for optically programmed encoders that makes this concept and product so exciting, unique and limitless in possibilities.

OBJECTS AND SUMMARY OF THE INVENTION

It is therefore an object of the present invention to provide encoder apparatus and methods that avoid the limits and problems associated with prior encoders.

It is another object of the present invention to provide encoder apparatus and methods that employ the concept of optical programmability or graphical programmability, to generate many different electrical signal waveforms, customized for particular applications.

It is a further object of the present invention to provide encoder apparatus, the elements of which can be optically programmed or graphically programmed to generate a desired electrical signal waveform.

It is yet another object of the present invention to provide encoder apparatus and methods for directly driving and controlling single and multi-phase A.C. motors and brushless D.C. motors.

It is yet a further object of the present invention to provide encoder apparatus and methods that rely on a single device to sense, analyze and control motor speed.

It is still another object of the present invention to provide encoder apparatus and methods that minimize the need for electrical or electronic devices to control motor operation.

It is still a further object of the present invention to provide encoder apparatus and methods that improve efficiency, torque and power output.

It is still another object of the present invention to utilize the optical programmability or graphical programmability of the encoder apparatus alone or together with associated motor drive circuitry, or with other optical and/or electronic waveform generating techniques.

It is still another object of the present invention to provide encoder apparatus and methods that are universally suitable for A.C. induction, A.C. synchronous, A.C. slip, D.C. brushless, D.C. stepper, single phase, multi-phase, few pole, many pole embodiments, and other motion control applications.

These and other objects are attained in accordance with the present invention wherein there is provided an optical encoder apparatus for converting the cyclic motion of an electro-mechanical machine into an electrical commutation signal having a waveform and frequency for driving the machine at an operating speed. The apparatus comprises optical means and photo-detection means. The photo-detection means generates an electrical signal in response to a pattern of radiant energy incident on the photo-detection means.

The optical means is optically coupled to the photo-detection means, and is configured to be actuated by the cyclic motion of the machine. The optical means modifies the pattern of radiant energy incident on the photo-detection means in accordance with a graphical function as the optical means is actuated by the cyclic motion of the machine.

The optical means includes an optical element configured to scan relative to the photo-detection means in accordance with the cyclic motion of the machine. The optical element contains an optically detectable pattern which is optically coupled to the photo-detection means. The optical means also includes an aperture means associated with the photo-detection means. The aperture means permits a controlled amount of radiant energy to pass to the photo-detection means.

The aperture means and optically detectable pattern are defined by the above-mentioned graphical function. The graphical function is derived from the waveform of the commutation signal. The function defines a relationship between the operating speed of motion of the machine and the frequency of the commutation signal. The commutation signal is generated from the photo-detection means as the optically detectable pattern is scanned relative to the aperture means.

The optical encoder apparatus may further comprises at least one emitter source, optically coupled to the photo-detection means, for directing a supply of radiant energy to the photo-detection means. The emitter is coupled to the photo-detection means by way of a graphically or geometrically shaped optical path.

The encoder apparatus of the present invention has particular application in efficiently controlling the operation of an electric motor by producing signal waveforms that are specifically matched and synchronized to a particular motor. For example, the encoder may be used as a variable speed controller which synchronizes frequency of the drive signals to the motor speed. In such case, the controller would include an amplifier for amplifying the electrical signals generated by the encoder, and for providing a means for adjusting the voltage level of the drive signals to initiate a speed change.

A method of converting the cyclic motion of an electro-mechanical machine into at least one electrical signal having a predetermined waveform, is also contemplated by the present invention. In addition, methods of controlling the operation, including speed, of an electric motor are contemplated by the present invention.

Other methods are also contemplated by the present invention. One such method concerns producing a resultant output signal from two output signals generated by an encoder. This method comprises the following steps of: (a) generating a first output signal from the encoder, wherein the first output signal has a first number of waveform cycles per mechanical cycle of the encoder; (b) generating a second output signal from the encoder, wherein the second output signal has a second number of waveform cycles per mechanical cycle of the encoder; (c) applying the first output signal to the second output signal to produce the resultant output signal, wherein the resultant output signal includes a resultant number of waveform cycles per mechanical cycle of the encoder, and wherein the resultant number of waveform cycles is determined by the first and second numbers of waveform cycles of the first and second output signals.

Another method of the present invention involves varying the output of at least one emitter in response to an output signal of an encoder, to generate a particular resultant or application signal. The method comprises the steps of: (a) generating a first electrical output signal from the encoder, wherein the first output signal has a number of waveform cycles per mechanical cycle of the encoder; (b) coupling the first output signal to a radiant energy emitter; (c) varying the radiant energy output of the emitter as a function of the first output signal; (d) coupling varying radiant energy from the emitter to a detector; and (e) using the detector to detect the coupled radiant energy and generate the electrical application signal therefrom, wherein the application signal includes a number of waveform cycles per mechanical cycle of the encoder, and wherein the number of cycles of the application signal is a function of the number of waveform cycles of the first output signal.

A further method of the present invention involves varying the output characteristic of at least one photo-detector in response to an output signal of an encoder, to generate a particular resultant or application signal. The method comprises the steps of: (a) generating a first electrical output signal from the encoder, wherein the first output signal has a number of waveform cycles per mechanical cycle of the encoder; (b) coupling the first output signal to a photo-detector; (c) varying the output of the detector as a function of the first output signal; and (d) generating the electrical application signal from the varying output of the detector, wherein the application signal includes a number of waveform cycles per mechanical cycle of the encoder, and wherein the number of cycles of the application signal is a function of the number of waveform cycles of the first output signal.

BRIEF DESCRIPTION OF THE DRAWING

Further objects of the present invention will become apparent from the following description of the preferred embodiments with reference to the accompanying drawing, in which:

FIG. 1 is a schematic representation of a single-channel optical encoder configured in accordance with the present invention, coupled to a single phase A.C. induction motor;

FIG. 2 is a schematic representation of a photo-detector element of the optical encoder of FIG. 1, showing an instantaneous pattern of radiant energy incident upon the photo-responsive surface of the detector;

FIGS. 9A–D and 9A–1 show, respectively, an optical encoder disc of the present invention having a corrected graphical pattern for generating a repeating non-uniform waveform and showing an enlarged view of the correction, the corresponding corrected and uncorrected waveform functions, an equivalent linear representation (X-Y) of the uncorrected graphical pattern, and an equivalent linear representation (X-Y) of the corrected graphical pattern;

DESCRIPTION OF THE PREFERRED EMBODIMENTS

Figure 3A:
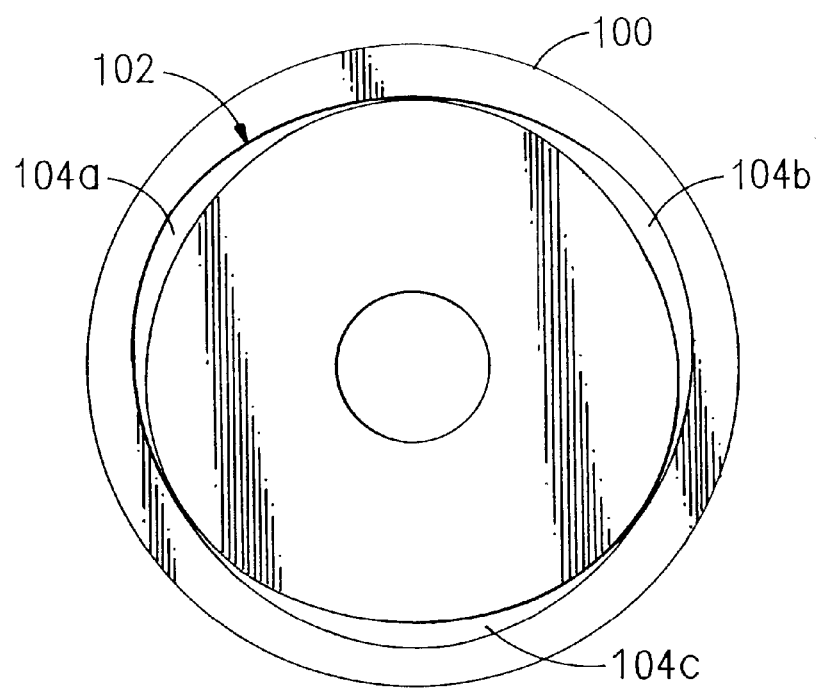
FIGS. 3A–B show, respectively, an optical encoder disc configured in accordance with the present invention having a graphical pattern for generating a sinusoidal waveform, and the corresponding waveform function.

Referring now to FIG. 1, there is shown a schematic representation of the essential elements of an optical encoder embodiment of the present invention. A single phase, three pole pair, A.C. induction motor 10 includes a stator assembly 12 and a rotor assembly 14. Stator 12 includes three pairs of windings. A winding pair 16a and 16b are connected together in series between ground and an A.C. input A. The other winding pairs are similarly connected, and all winding pairs are connected together in parallel as shown. When the windings are energized by an A.C. input signal, six magnetic poles are established in stator 12, and these poles induce a corresponding number of poles in rotor 14. Motor 10 can be started by any well known method such as by a start winding (not shown).

Rotor 14 includes a shaft 18 which rotates about a central axis 20. Coupled to shaft 18 is an optical encoder 22 configured in accordance with the present invention. Encoder 22 includes at least one photo-emitter device 24 which is preferably an infrared light emitting diode (LED). A photo-detector device 26 is aligned with photo-emitter 24, and is responsive to the radiant energy emitted from emitter 24. Detector 26 generates an electrical signal which is proportional to the quantity of radiant energy incident on photo-detector 26. Detector 26 is preferably a phototransistor. Both emitter 24 and detector 26 are fixed in position and aligned along an optical path 28. An optical element, in the form of an encoder disc 30, is coupled to shaft 18 and is made to rotate with shaft 18. Encoder disc 30 contains an optically detectable graphical pattern 32 which includes at least one graphically shaped cycle 34. In the preferred embodiment, graphic cycle 34 is implemented in the form of an optical window.

In many applications involving the control of an electric motor, the number of graphic cycles 34 are equal to the number of pole pairs in the rotor. In addition, cycles 34 are physically (angularly) aligned with the pole pairs. In some applications, this condition of matching the graphic cycles to the poles is not followed, as will be described hereinbelow. Also, it will become clear from the discussion to follow that cycles 34 are not always implemented as discrete optical windows. In some cases, one cycle may gradually transition into another. In addition, cycles 34 could be implemented as opaque areas on a transparent (or translucent) encoder disc. In another embodiment, cycles 34 could be reflective patterns in a reflective encoder embodiment.

With further reference to FIG. 1, encoder disc 30 has a central axis 31 which is aligned with axis 20 of rotor 18. Disc 30 rotates about central axis 31. Encoder 22 further includes a mask 36 which is preferably in the form of a disc. Mask 36 contains a wedge-shaped aperture 38. Mask 36 has a central axis 37 which is physically aligned with central axis 31 of encoder disc 30. Mask 36 is not coupled to rotor shaft 18, and is intended to remain stationary during operation of encoder 22.

Encoder disc 30 is actuated by the rotating motion of shaft 18, causing graphical pattern 32 to scan through optical path 28. In this sense, disc 30 is optically coupled to optical path 28. As shown in FIG. 1, pattern 32 is coaxially disposed about central axis 31, along an imaginary scan track.

As shown in FIG. 1, aperture 38 of mask 36 is aligned with optical path 28 and pattern 32. The function of aperture 38 is to permit a restricted, and graphically controlled amount of radiant energy to pass to detector 26. The "y" dimension of aperture 38 is equal to the maximum "y" dimension of graphical pattern 32 (See FIG. 1). This dimensional relationship is illustrated, for example, in FIG. 4C. FIG. 7C illustrates that the "y" dimension of the mask aperture (310) and the maximum "y" dimension of at least some of the graphic cycles (314b and 314c) may differ. The dimensions of aperture 38 are preferably smaller than the photo-responsive surface of detector 26. Aperture 38 is configured and dimensioned to ensure that a defined radiant energy pattern is established on the photo-responsive surface of detector 26. This requirement will be further described with reference to FIG. 2 below.

As shown in FIG. 1, a potentiometer 40 is electrically connected between a voltage supply Vcc and ground. The output of detector 26 is electrically connected to an adjustable wiper 42 of pot 40. Wiper 42 is directly connected to a power amplifier 44. Amplifier 44 must be capable of amplifying the low voltage output of detector 26 to a voltage level compatible with driving the windings of motor 10. In many applications, amplifier 44 must amplify the detector output to a level of at least 120 volts RMS. Amplifier 44 can be either a specifically designed and optimized device or a standard, commercially available power amplifier. Even higher efficiency Class "C" (frequency to inductance tuned) amplifiers may be employed when the commutation signals are expected to be sinusoidal. Preferably, the amplifier should have a gain adjustment so that its output can be adjusted.

In some applications, the signal output level of encoder 22 can be adjusted by varying the voltage supply that energizes emitter 24 and/or detector 26. With this approach, encoder signal output level can be varied, for example, between 1.5 volts and 12 volts. Level adjustment could be accomplished automatically, for example, in response to a system control signal.

To complete the encoder feedback loop, the output of amplifier 44 is connected to the input terminal A of motor 10. The signal waveform generated by encoder 22 is directly applied to the windings of motor 10. Accordingly, the present invention provides direct commutation control of motor 10.

It is to be understood that the optical encoders of the present invention are optically programmed. All of the optical elements of the encoder are considered programmable parameters, including, without limitation, photo-emitters and their radiant energy output, encoder discs, mask apertures, lenses, shutters, prisms, and any other optical elements or devices employed to modify a pattern of radiant energy incident on the photo-detection element or elements of the encoder. The characteristics of the optical elements employed in the encoder are selected, configured or adjusted (i.e., programmed) so that the encoder can produce a predetermined electrical signal waveform output. The combined optical response of these optical elements, as configured in the encoder, may be referred to as an optical function. Therefore, the pattern of radiant energy incident on the photo-detector means of the encoder is modified in accordance with an optical function, and this function represents the combined optical response of the optically programmed elements affecting the incident pattern at the photo-detector means.

In the preferred embodiment, the optical function includes at least one "graphical function" which represents the optical response of a graphical pattern contained on the encoder disc, or the combined responses of the graphical pattern and a mask aperture. It is to be understood that the optical function may include other graphical functions attributable to other elements in the encoder's optical path. The term "graphical function" is further defined below.

Referring again to FIG. 1, encoder disc 30 and mask 36 are both optically programmed in that their optically responsive features (e.g., cycles 34 and aperture 38) are positioned, configured and dimensioned in accordance with a graphical function. The term "graphical function," for the purposes of this application, includes without limitation: mathematically defined geometric, algebraic and dimensional functions; and empirically derived graphical representations which may or may not be mathematically definable.

In the preferred embodiment, the selected graphical function is a transform of an electrical waveform function. In motor control applications, an electrical waveform is specified for optimally driving the motor under expected load conditions. For example, a motor which is to drive a compressor in an air conditioner, will experience a non-uniform load condition for every turn of the motor shaft. In such case, a corresponding non-uniform waveform for the drive signal may be optimally specified. An example of such a waveform is shown in FIG. 7B. Once an optimum waveform function is identified, its graphical or algebraic equivalent can be derived by using algebraic area-fill equations (described hereinbelow). In encoder 22, the graphical function is physically realized by the combined optical effect of graphical pattern 32 and aperture 38, as encoder disc 30 rotates with motor shaft 18, causing pattern 32 to scan by aperture 38.

Radiant energy from emitter 24 is directed along optical path 28 until it becomes incident upon the photo-responsive surface of detector 26. The incident radiant energy forms a pattern on the photo-responsive surface of detector 26. This surface is illustrated in FIG. 2, and identified by reference numeral 46. The pattern of incident radiant energy may be bounded by the entire dimensions of surface 46. However, it is preferred that aperture 38 define the maximum dimensions of the pattern. As shown in FIG. 2 (for illustrative purposes only), aperture 38 has defined a restricted area 48. It is to be understood that area 48 can be configured in any shape in accordance with a desired graphical function.

The combined optical effect of disc 30 and mask 36 can be understood with further reference to FIG. 2. Within area 48, an unshaded region 50 represents the instantaneous pattern of incident radiant energy on surface 46. A shaded region 52 represents the absence of radiant energy within bounded area 48. In a reflective encoder system, regions 50 and 52 would represent varying degrees of intensity of the incident radiant energy in a complex interference pattern.

To aid in the description, an x, y coordinate system has been drawn on surface 46. For a given instant in time, the pattern of incident radiant energy 50 is defined by a particular graphic shape in the x, y coordinate domain. As understood from FIG. 2, pattern 50 will vary in a number of different directions, in two dimensional space. As graphical pattern 32 scans by aperture 38, incident radiant energy pattern 50 is modified or re-shaped in a plurality of directions. The arrows in FIG. 2 schematically illustrate the directions in which the pattern may be modified. The incident pattern 50 is modified in accordance with the defined graphical function which, in this case, is realized by graphical pattern 32 scanning by aperture 38.

Photo-transistor 26 is responsive to the instantaneous radiant energy pattern 50, and generates an electrical signal that is proportional to the quantity of radiant energy represented in pattern 50. Detector 26 is characterized by a photo-electric response which, when linear, generates an electrical signal having a waveform that matches the waveform function originally specified. The photo-electric response does not have to be linear. In fact, the response can be used as an additional programmable design parameter to produce a desired waveform. In this embodiment, the product of the photo-electric response of detector 26 and the specified waveform function will define the electrical signal waveform produced at the output of detector 26.

The design of the optical encoder of the present invention will now be explained with reference to two motor control examples. It is to be understood that this design process is equally applicable to other types of encoders in which graphically shaped patterns or areas can be utilized. First, consider a synchronous example involving a single phase A.C. motor, having three pole pairs, such as in FIG. 1. At synchronous speed, this motor revolves at 1200 RPM or 20 RPS (revolutions per second). The motor, to turn at synchronous speed, requires 60 Hz and 120 Volts. This frequency is created by an optically programmed encoder disc and mask combination, with the encoder disc being directly coupled to the rotor shaft of the motor. The optically detectable graphical pattern contained on the encoder disc must include three graphic cycles to produce three corresponding electrical waveform cycles per revolution of the rotor shaft. Such an arrangement is shown in FIG. 3A for a sinusoidal waveform.

Figure 3B:
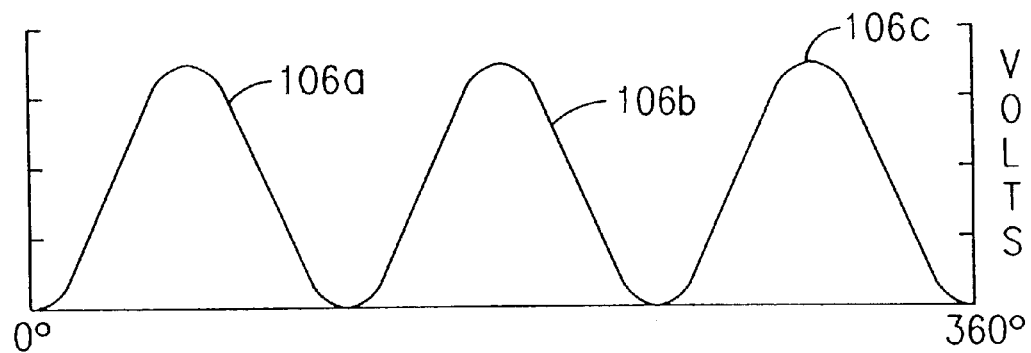
Figure 5:
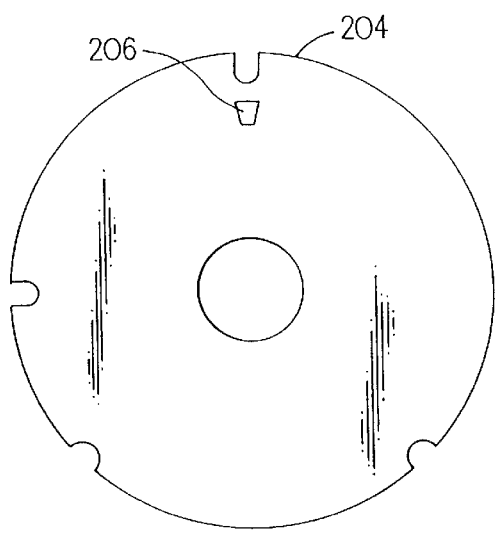
FIG. 5 is a top plan view of a mask configured in accordance with the present invention, used with the encoder discs of FIGS. 3A and 4A, to produce signals having waveforms corresponding to the waveform functions of FIGS. 3B and 4B.

In FIG. 3A an encoder disc 100 contains a graphical pattern 102 which includes three graphic cycles 104a–c. The mask aperture used with disc 100 is shown in FIG. 5. When disc 100 is turning at 20 RPS, a 60 Hz sinusoidal A.C. signal is produced by the encoder (20 RPS times 3 electrical cycles per revolution). As shown in FIG. 3B, one revolution of encoder disc 100 (0–360°) will produce three electrical cycles 106a–c. This is the desired waveform function for the example.

Graphical pattern 102 of encoder disc 100, and the mask aperture shown in FIG. 5, are created, first, by expressing the desired waveform function in the form of a vector data table. In this sinusoidal example, the vector table values are arrived at using the expression y=sin (electrical degrees)

There are three complete electrical cycles expressed over 360 mechanical degrees (one physical revolution). Therefore, there are 1080 electrical degrees over one revolution of the disc. The vector data can be plotted to give visual feedback as to how the final waveform will look. (FIG. 3B represents both the plotted input waveform and the resultant photo-transistor electrical output.)

The next step is to determine the shape of graphic cycles 104a–c in optical pattern 102. This is accomplished by using algebraic area-fill equations. The vector values computed from the above equation are inserted into the following equations:

$$V_{n+p} = \frac{(W_{n+1} - W_n) * v/8 + V_{n-m}}{64} * 2$$

Where:

| | | |
|---|---|---|
| V | = | Disc area fill vector |
| W | = | Waveform point, originating in waveform input file |
| p | = | Number of points in waveform input file |
| $m_i$ | = | Mask width, input parameter |
| m | = | Mask width, scaled |
| n | = | 1, 2, 3, ...p |
| v | = | Vector scale factor, input parameter |

The expressions $(W_{n+1}-W_n)*v/8$, and $V_{n-m}$, assume the value of zero if the respective calculated results are negative. The mask aperture shape is adapted for proper attenuation of the optical signal. In this example, the equation is $m=m_i$, If $p/2 > m_i$ $m=p/2$, If $p/2 < m_i$ Where:

p=Number of points in waveform input file $m_i$=Mask width, input parameter m=Mask width, scaled and $m_i>=2$.

The above equations are only examples for an X, Y area fill for horizontal motion of the disc pattern relative to mask. For rotational motion, polar values are used. It is understood that there are numerous equations, algorithms or other methods to arrive at a suitable disc/mask combination to create the necessary optically produced waveform. In the final step, the disc and mask are printed in accordance with the algebraic area-fill values obtained from the above equations (fitted to radial vs horizontal motion). These same area-fill values may be used to configure (or shape) other types of responsive encoder elements such as, for example, reflective surfaces or patterns, capacitive plates, magnetic strips, etc.

Now consider a non-synchronous example. First, determine from the frequency and normal operating speed of the motor, how many cycles it needs per revolution. For example, if you have a 60 Hz motor with a normal operating speed of 1,050 RPM's, you need 3.428 electrical cycles per revolution at 120 Volts A.C. After you have determined the number of electrical cycles needed, and find that it is a non-integer number, you round this number up to the next nearest whole cycle, or up a few more whole cycles. For example, if the motor requires 3.428 electrical cycles per revolution, then four cycles (or five or six cycles) per revolution may be selected to design the encoder disc. (This method of rounding up to the next whole integer cycle is an option if a lower drive voltage is preferred for given speeds).

In a next step, this higher number of cycles per revolution is optically programmed on the encoder disc using the area fill equations described above. The programmed disc, when installed on the motor under load, may produce a signal that runs the motor (after direct amplification) at a higher speed than its normal operating speed at 120 Volts A.C., because of the greater number of cycles per revolution. In such a case, the performance of the motor will be improved (i.e., a higher speed is achieved at the same load and input power). By lowering the voltage input to the motor, the motor and encoder disc slow down to a normal operating speed of 60 Hz. The motor is driven at its normal operating speed (60 Hz) with less than the specified voltage (120 VAC), thus reducing the amount of energy needed to run the motor for the same load. If the load required more energy (i.e., the motor did not speed up), then there would be no need to lower the voltage, as the encoder did not exceed a speed of 60 Hz, so that the input energy would match the more demanding load.

Figure 6:
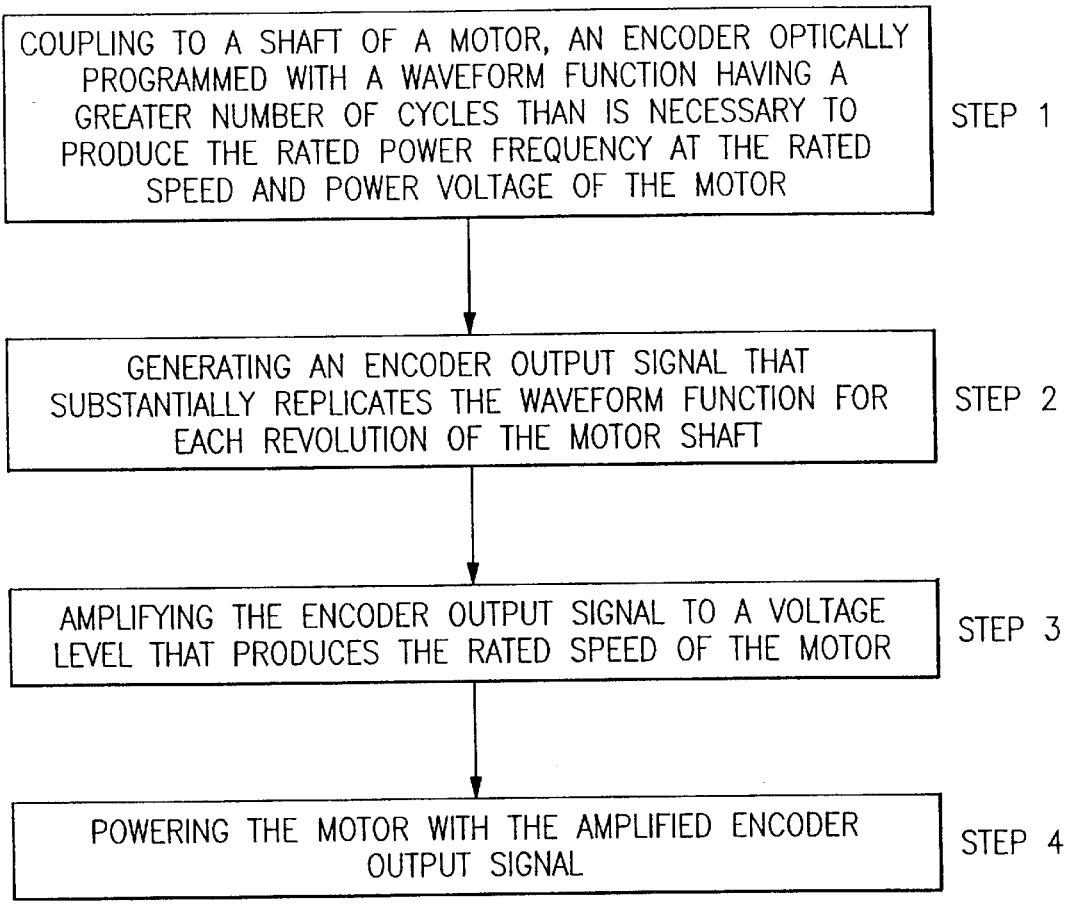
FIG. 6 is a flow diagram, outlining the preferred embodiment of a method of the present invention.

FIG. 6 shows a flow diagram outlining one embodiment of the above-described method of operating a motor. This method is applicable whether or not a non-integer number of cycles is computed for the rated speed, frequency and voltage of the motor. In Step 1, an optical encoder of the present invention is coupled to a shaft of a motor. The encoder is optically programmed with a waveform function having a greater number of electrical cycles than is necessary to produce the rated power frequency at the rated speed and power voltage of the motor. In Step 2, an encoder output signal, that substantially replicates the waveform function, is generated for each revolution of the motor shaft. In Step 3, the encoder output signal is amplified to a voltage level that produces the rated speed of the motor. Finally, in Step 4, the motor is powered with the amplified encoder output signal. Further, in accordance with this method, the voltage level of the encoder output signal can be varied to vary the speed of the motor and thus vary the frequency of the encoder signal to a specified number.

In both the synchronous and non-synchronous examples described above, once the encoder speed is calibrated to the motor operating frequency, the speed of the motor can be controlled by merely adjusting the voltage input to the motor, and the calibrated encoder will ensure that the speed is always matched to the frequency.

Figure 4A:
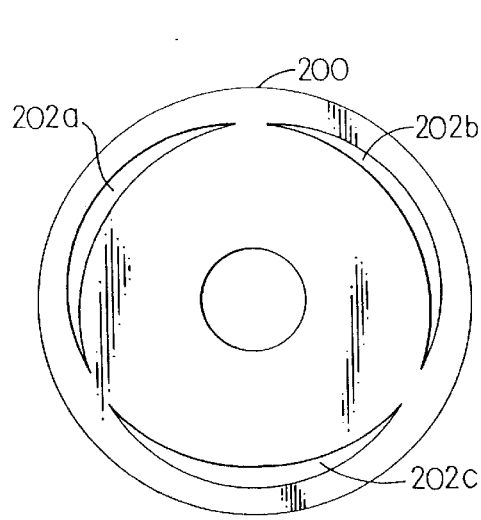
FIGS. 4A–C show, respectively, an optical encoder disc of the present invention having a graphical pattern for generating a trapezoidal waveform, the corresponding waveform function, and an equivalent linear representation (X-Y) of the circular graphical pattern of FIG. 4A and corresponding mask aperture.
Figure 4B:
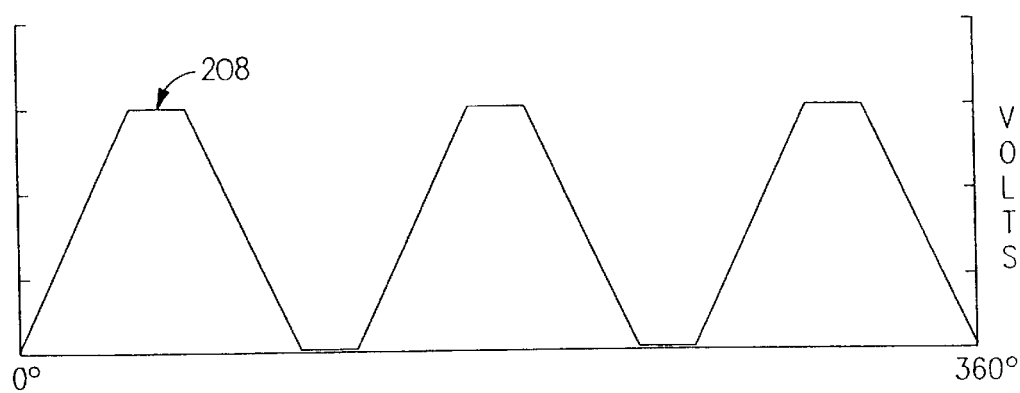
Figure 4C:
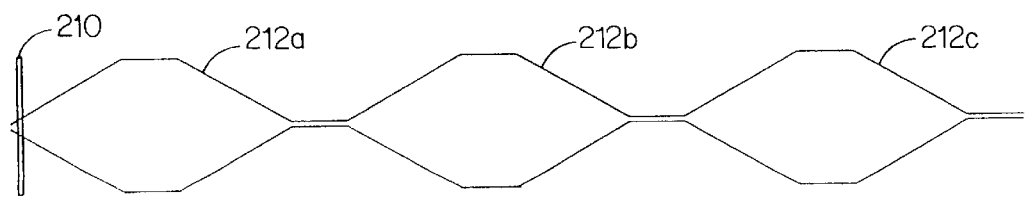

Some examples of encoder discs, and the waveform functions used to graphically encode the discs are shown in FIGS. 3A–B, 4A–C, and 7A–C. In FIG. 4A, an encoder disc 200 contains a graphical pattern comprising three graphic cycles 202a–c. In this example, graphic cycles 202a–c are transparent optical windows. FIG. 5 shows a mask 204 containing a mask aperture 206 which is intended to be used with disc 200. A waveform function 208 is shown in FIG. 4B, and is used to determine the shapes of cycles 202a–c and mask aperture 206. Waveform function 208 also represents the actual electrical signal output of the encoder. An equivalent linear representation (X-Y) of graphic cycles 202a–c and mask aperture 206 are shown in FIG. 4C. A mask aperture 210 corresponds to aperture 206, and cycles 212a–c correspond to cycles 202a–c.

Figure 7A:
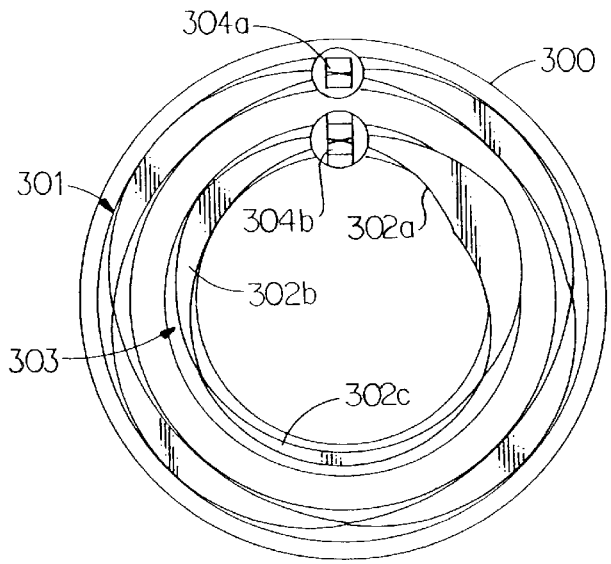
FIGS. 7A–C show, respectively, another optical encoder disc of the present invention having a uniform and a non-uniform graphical pattern, a waveform function corresponding to the non-uniform pattern, and an equivalent linear representation (X-Y) of the non-uniform graphical pattern shown in FIG. 7A and the corresponding mask aperture.
Figure 7B:
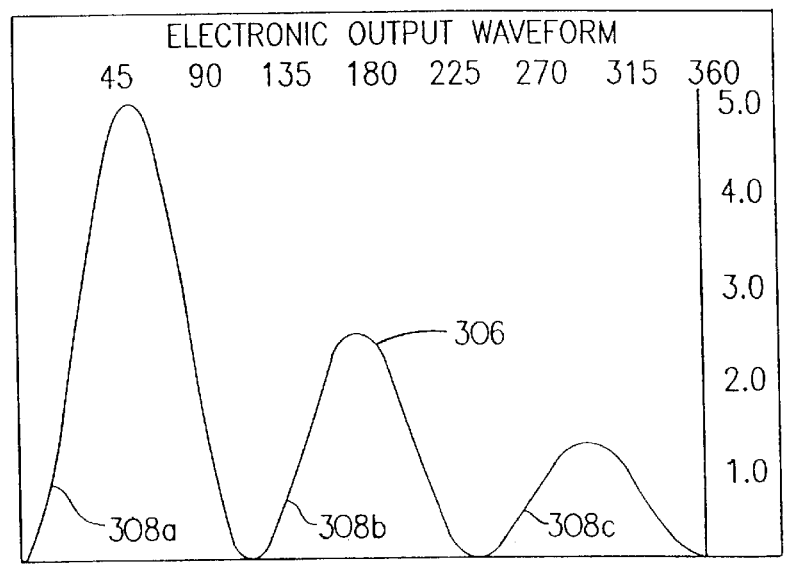
Figure 7C:
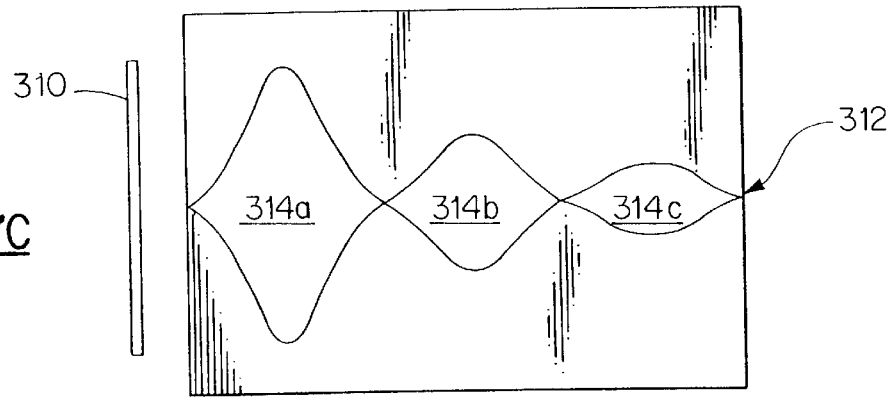

FIGS. 7A–C illustrate a non-uniform waveform example. In FIG. 7A, a transparent encoder disc 300 contains an uniform graphical pattern 301 and a non-uniform graphical pattern 303. Graphical pattern 301 contains four uniform graphic cycles, and pattern 303 contains three non-uniform graphic cycles 302a–c, as shown. The graphic cycles of pattern 301 and cycles 302a–c of pattern 303 are opaque optical reticles, printed on transparent encoder disc 300 ("opaque on clear"). FIG. 7A also shows a pair of mask apertures 304a and 304b, configured and dimensioned to be used with patterns 301 and 303 respectively. Graphical pattern 301 is not used in this example. As understood from FIGS. 7A and 7B, the non-uniform sizes of cycles 302a–c correspond to the non-uniform sizes of electrical cycles 308a–c respectively, of a predetermined waveform 306. Waveform 306 represents the waveform function used to determine the shapes of graphic cycles 302a–c and mask aperture 304b. Waveform function 306 also represents the shape of the encoder output signal needed, for example, to drive a variable motor load. An equivalent linear representation (X-Y) of graphical pattern 303 and mask aperture 304b is shown in FIG. 7C. As shown in FIG. 7C, a mask aperture 310 corresponds to aperture 304b, a graphical pattern 312 corresponds to pattern 303, and graphic cycles 314a–c correspond to cycles 302a–c.

In those applications where it is desirable to produce a non-integer number of electrical cycles per revolution of the encoder disc, a certain graphic correction may be required to the graphical shapes produced by the area-fill equations. A graphical correction may also be required when creating the graphical shapes for a non-uniform waveform function such as shown in FIG. 9B. Correction may be required because a waveform function which is non-uniform or contains a non-integer number of cycles may produce a discontinuity each time it is repeated (i.e., each revolution of the encoder disc). FIGS. 8A–F illustrate the problem, and one approach to correcting for it.

Figure 8A:
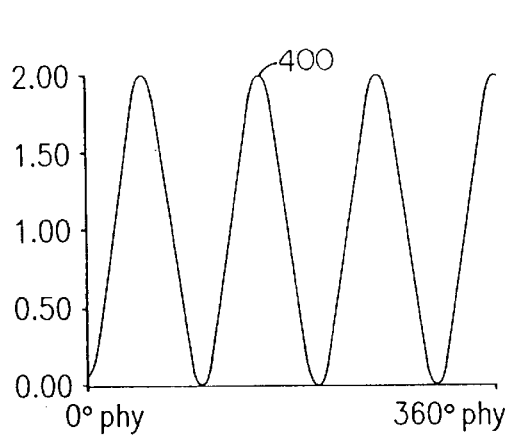
FIGS. 8A–F are waveform plots illustrating a method of graphically correcting for discontinuities in signals produced from non-integer waveform functions.
Figure 8B:
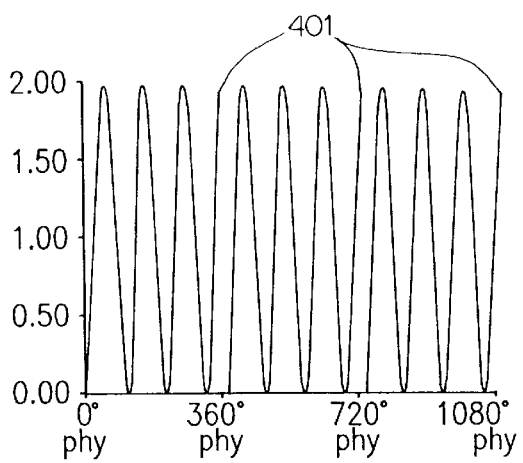
Figure 8C:
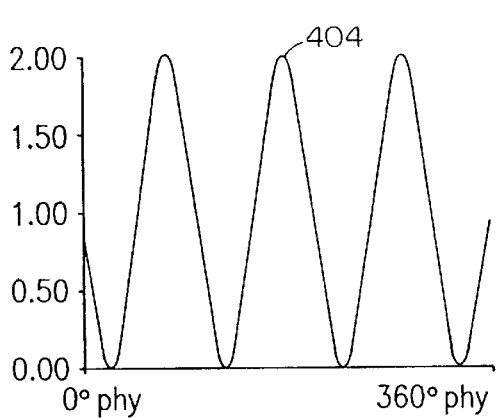
Figure 8D:
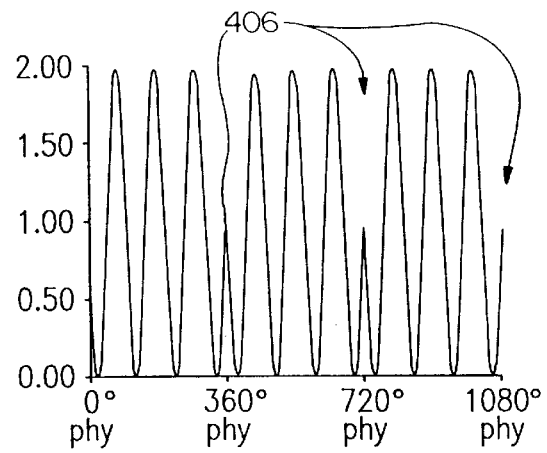
Figure 8E:
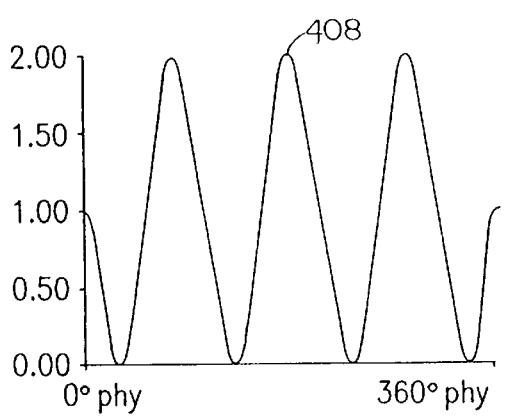
Figure 8F:
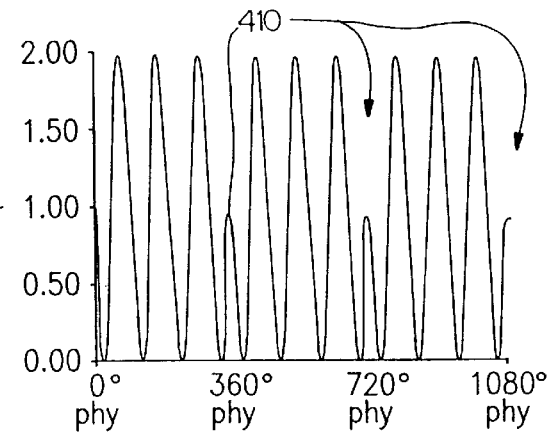

In FIG. 8A, a sinusoidal waveform function 400 has 3.428 cycles per revolution. FIG. 8B shows this function repeated three times (representing three revolutions), and shows a discontinuity 401 occurring at the end of each revolution. To correct for this, waveform function 400 is phase shifted by approximately −90° (actually −0.428 cycles) as shown in FIG. 8C (phase shifted waveform 404). Phase shifted waveform 404 is repeated three times in FIG. 8D. As shown, a discontinuity 406 at the end of each revolution has been diminished. However, sharp spikes still exist at the end of each revolution. These spikes can be smoothed out by empirically, graphically shaping the final shapes on the encoder disc and/or mask. FIG. 8E shows a waveform function 408 which results from the empirically adjusted graphical shapes of the encoder disc and mask. Note the start and end points of waveform 408 have been rounded compared to waveform 404. In FIG. 8F, waveform 408 is repeated three times to illustrate that the discontinuities shown in FIGS. 8B and 8D have been diminished. The electrical signal waveform produced by the corrected graphical function would resemble the repeating plot of FIG. 8F. Note that the above described correction method requires the implementation of a waveform phase shift, by proper positional adjustment of the graphical pattern on the encoder disc and/or the mask aperture.

An example of an encoder disc that has been graphically adjusted to correct for a discontinuity is shown in FIG. 9A. An encoder disc 450 comprises a graphical pattern having three graphic cycles 452a–c. A waveform function 454 (See FIG. 9B) is encoded on disc 450. As shown in 9B, waveform 454 is a non-uniform function with a starting point 456 and an ending point 458. As shown, these points are at different levels, and will produce a discontinuity when the function is repeated. In this case, the phase shifting step of the method described above, with reference to FIGS. 8A–F, cannot be employed because of the non-uniformity of the waveform. However, starting point 456 or ending point 458, or both, can be adjusted to minimize the discontinuity.

An adjustment of the incident radiant energy pattern, in the "y" dimension (See FIG. 2), will effect the necessary correction. In this example, the adjustment is accomplished by modifying the graphic pattern on disc 450, as shown in the enlarged view of FIG. 9A. In the enlarged view of FIG. 9A, the uncorrected junction between graphic cycles 452a and 452c, at point LC, is shown in solid lines. The graphically corrected junction is shown in phantom lines. In this case, the graphic correction consists of merging the discrete ends of graphic cycles 452a and 452c into one continuous graphical transition Y1. This correction causes start point 456 (See FIG. 9B) to raise up in level and match more closely to end point 458. FIG. 9C shows an equivalent linear representation (X-Y) of the uncorrected graphical pattern on encoder disc 450, and FIG. 9D shows an equivalent linear representation (X-Y) of the corrected graphical pattern. Note the difference between the pattern in FIG. 9C (at points 456 and 458) and the pattern in FIG. 9D (at points Y1, Y1). The points Y1,Y1 in FIG. 9D match.

The preferred construction of the optical encoder of the present invention, and its preferred attachment to a motor, are described in detail in International PCT Appl. No. PCT/US96/02275, filed Feb. 27, 1996, and published on Sep. 6, 1996, under International Pub. No. WO 96/27118, and said description is incorporated herein by reference.

Figure 10A:
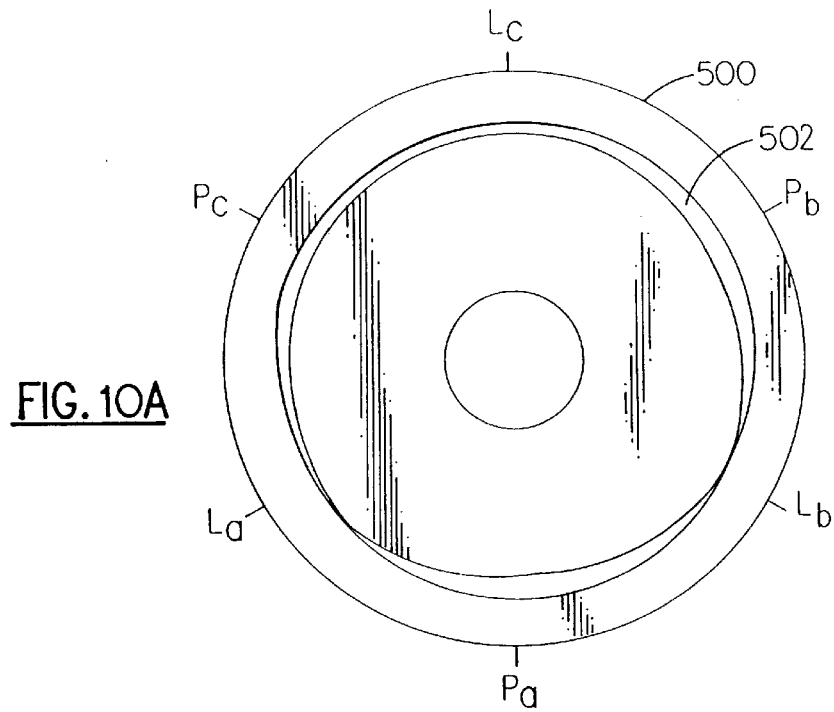
FIGS. 10A–B shows, respectively, a top plan view of an encoder disc of the present invention having a graphical pattern which corresponds to a non-integer waveform function, and a graphical plot of a non-integer waveform function corresponding to the graphical pattern of FIG. 10A.
Figure 10B:
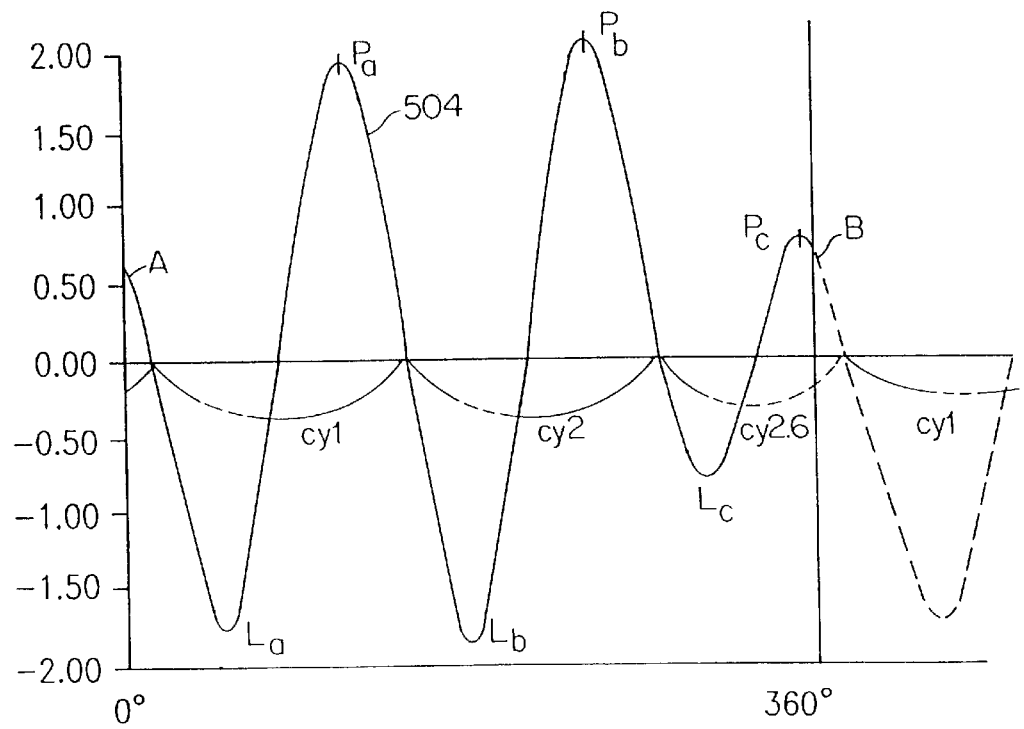

As mentioned above, it may be desirable in certain applications to drive an A.C. motor with a signal that has a non-integer number of cycles for each revolution of the motor shaft. In the example discussed above, a signal having 3.428 cycles per revolution may be desirable to achieve a 60 Hz power signal frequency from the encoder when the motor is operating at its rated speed (less than synchronous speed). It was suggested that a waveform function having 3.428 cycles could be encoded onto an encoder disc. FIGS. 10A–B shows a top plan view of an encoder disc 500 containing graphical pattern 502. Graphical pattern 502 represents an optically encoded waveform function having 2.6 electrical cycles. FIG. 10B shows a waveform function 504 which is graphically encoded onto disc 500 as pattern 502. Points La, Pa, Lb, Pb, Lc, and Pc mark angular locations along graphical pattern 502 (See FIG. 10A), and corresponding points La, Pa, Lb, Pb, Lc, and Pc are marked on waveform function 504 (See FIG. 10B). As shown FIG. 10B, a start point A of waveform function 504 matches an end point B of the function.

Figure 11A:
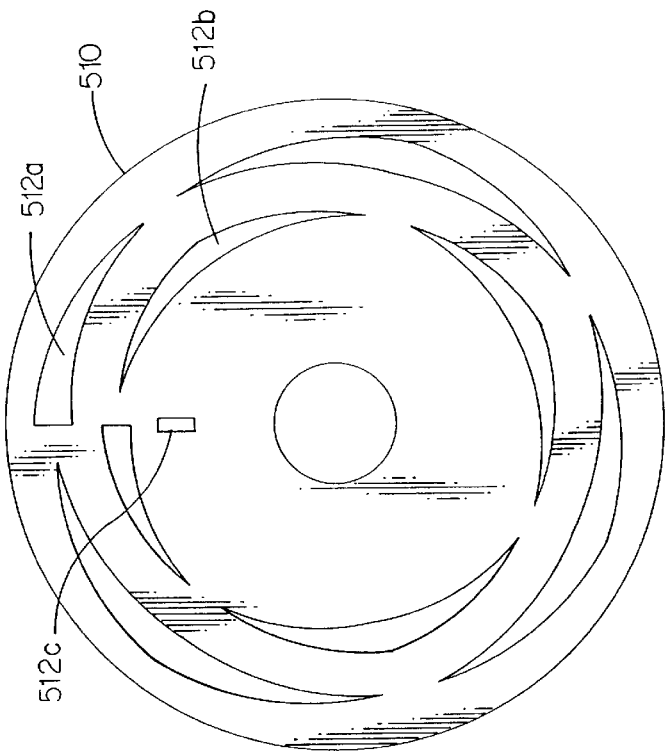
FIGS. 11A–B shows, respectively, a top plan view of another encoder disc of the present invention, and a graphical plot of a continuous waveform output corresponding to the encoder disc of FIG. 11A.
Figure 11B:
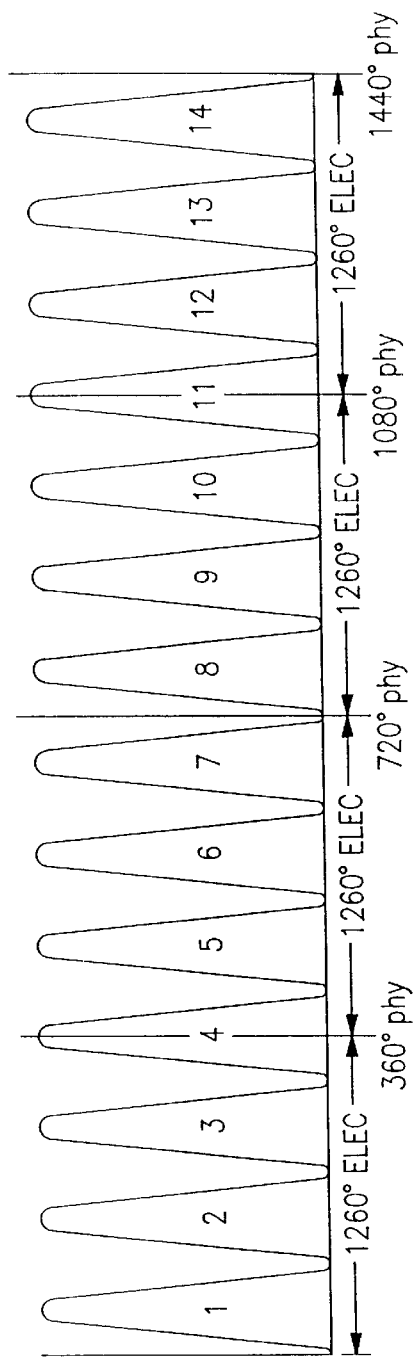

Referring now to FIGS. 11A–B, another way to produce a non-integer waveform is shown. In FIG. 11A, an encoder disc 510 has two graphical patterns 512a and 512b, and a locator aperture 512c. Graphical patterns 512a–b represent waveform functions having 3.5 electrical cycles each. Each 360° physical revolution of encoder disc 510 produces one transition signal as a result of locator aperture 512c. Each transition signal, combined with elementary circuitry, causes the encoder waveform output to alternate between patterns 512a and 512b. The continuous waveform output of this method is shown in FIG. 11B. As is evident, this example will produce seven full electrical cycles for every two complete 360° physical revolutions of disc 510, or 3.5 electrical cycles per one revolution. Other non-integer waveform cycles can be produced with this method by varying the number of concentric graphic patterns and the number of graphical cycles in each pattern.

Figure 12A:
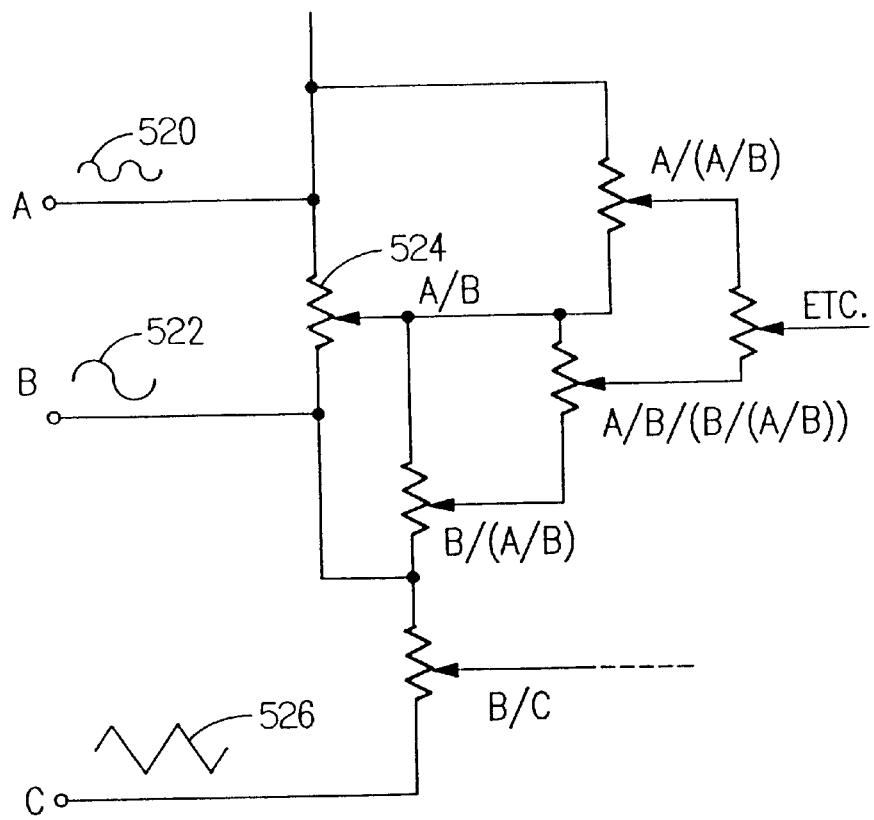
FIGS. 12A–B are circuit diagrams showing waveform shaping by electrical waveform combining.
Figure 12B:
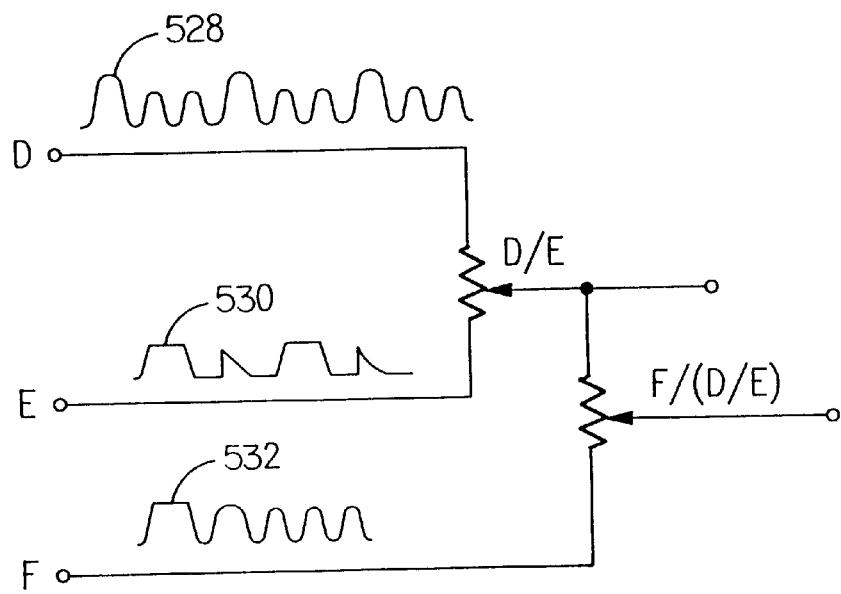

FIGS. 12A–B shows an alternative method of producing a signal having a non-integer number of cycles per revolution. In this alternative method, the desired waveform is derived electrically, simply by combining two or more waveforms. For example, as shown in FIG. 12A, a signal 520 at input A has N1 cycles per revolution which creates a frequency F1. A signal 522 at input B has N2 cycles per revolution creating a frequency F2. Signals 520 and 522 may be combined in various ways to produce still other frequencies Fn. These various "new" frequency results, Fn, can be derived from many standard frequency mixing methods of the present art. However, due to the non-linear nature of some of the output signals generated by the encoder of the present invention (i.e. variable amplitude, phase, duty cycle, etc.), both within one electrical cycle or over "N" cycles, other new frequency results should be achievable.

Also, in accordance with the present invention, such frequencies (cycles or waveforms) can be "shared" internal or external to the encoder. FIGS. 12A–B show a simple method for combining just two signals. These two signals are combined with a potentiometer 524, and the output A/B of potentiometer 524 will yield a signal having a new number of cycles (frequencies). As shown in FIG. 12A, different combinations of signals 520 and 522 can be obtained from the network of FIG. 12A.

The electrical combining, modifying and summing technique as described in FIG. 12A can also be used to further shape the output signals from the encoder of the present invention. As FIG. 12A illustrates, a triangular waveform 526 may be combined with sinusoidal waveform 522 to yield a differently shaped waveform at output B/C. FIG. 12A illustrates a simple "passive" method of waveform function modification. However the waveform types and mathematical derivations could be shaped, enhanced, combined in numerous other ways, but heretofore not made possible without this unique method of waveform creation.

FIG. 12B shows a similar waveform combining network, illustrating its capability of combining an amplitude varying function 528, at input D, with an arbitrary function 530, at input E, to produce a unique waveform output at D/E. Also, as shown in FIG. 12B, waveform output D/E can be combined with a frequency varying waveform 532 to produce an output F/(D/E).

Figure 13:
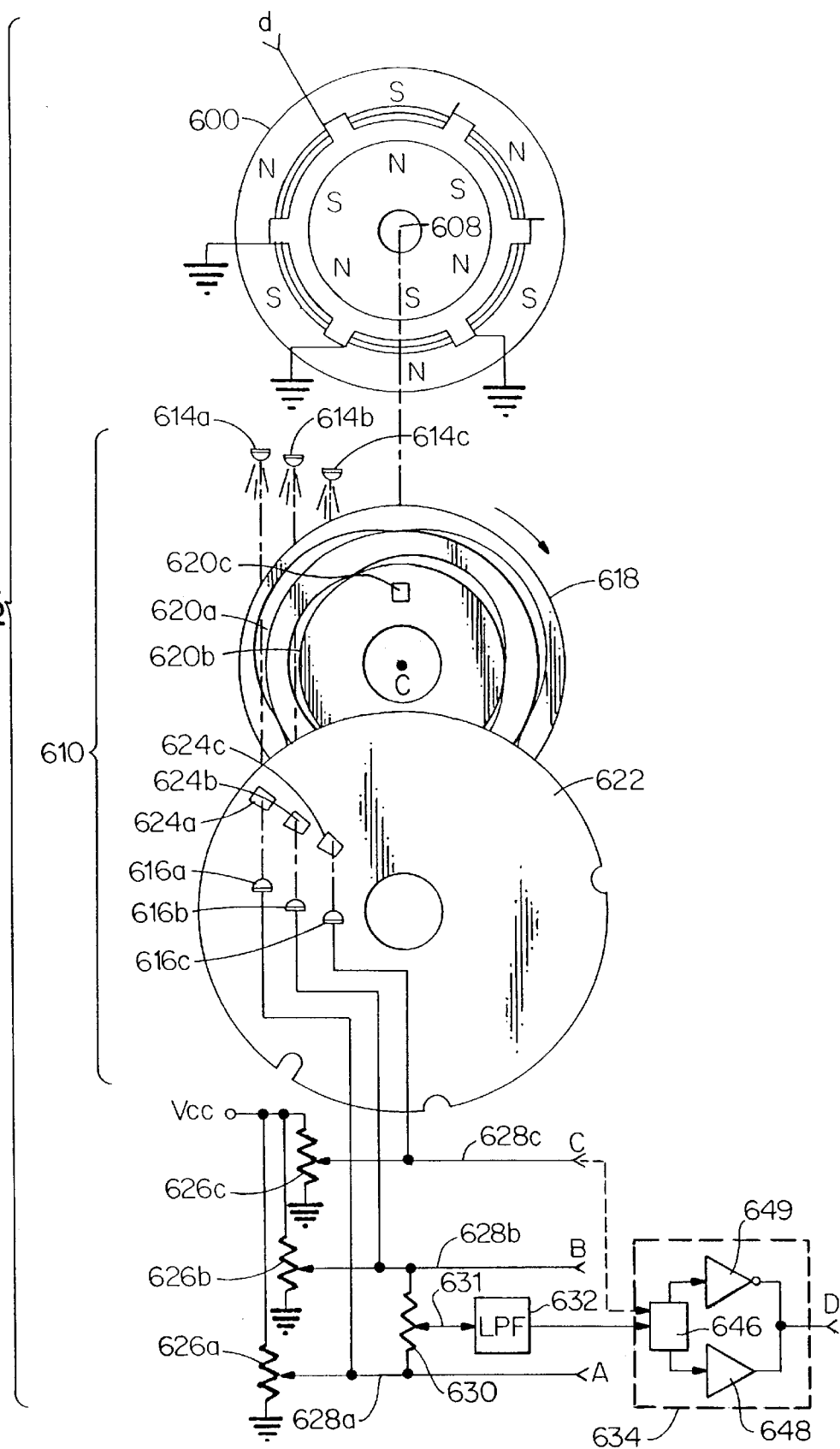
FIG. 13 is a schematic diagram of an electrical waveform combining technique of the present invention, employed with a single-channel optical encoder of the present invention.

An example of an encoder system employing a waveform combining network is shown in FIG. 13. In this example, the encoder is used to drive a single phase, three pole-pair, A.C. induction (non-synchronous) motor 600, with a normal operating speed of 1,050 RPMs. A three-channel encoder 610 is coupled to a rotor shaft 608 of motor 600 in the same manner as described with respect to encoder 22 in FIG. 1. Encoder 610 includes three infrared LED emitters 614a–c. Emitters 614a–c emit infrared energy along optical paths defined between the emitters and a corresponding number of photo-transistors 616a–c. Encoder 610 includes a multi-track optical encoder disc 618, configured to rotate about its central axis c. Disc 618 contains two coaxially disposed, optically detectable graphical patterns 620a and 620b, and an indexing aperture 620c. Encoder 610 further includes a mask disc 622 containing three apertures 624a–c. As with encoder 22 of FIG. 1, mask 622 is held stationary while encoder disc 618 rotates with shaft 608. Mask apertures 624a–c are aligned with patterns 620a, 620b, and aperture 620c, respectively, along the optical paths.

Encoder 610 includes three potentiometers 626a–c which are electrically connected between a d.c. voltage supply Vcc and ground. The output leads of photo-transistors 616a–c are connected to the adjustable wipers of pots 626a–c, respectively, and to output leads 628a–c, respectively. Output leads 628a–c terminate at encoder output ports A, B and C, respectively. A potentiometer 630, including an adjustable wiper 631, is connected across output leads 628a and 628b. Pot 630 functions as a signal combiner, combining output signals generated by encoder 610 on leads 628b and 628a. The output end of wiper 631 is connected to a lowpass filter 632. The output of filter 632 is connected to the input of a switched amplifier stage 634. In this example, the output D of amplifier stage 634 is applied directly to the windings of motor 600 via motor input terminal d. Amplifiers may also be employed on leads 628b and 628a before pot 630 to amplify the encoder signals before combining. If the individual encoder signals are also to be used separately, amplifiers may be connected to leads 628b and 628a after pot 630.

Encoder 610 generates the electrical signal outputs in the same manner as described with reference to FIGS. 1 and 2.

In the example shown in FIG. 13, optically detectable pattern 620a is configured to generate an electrical output signal at encoder port A, which is a sine wave having 96.5 waveform cycles per revolution of disc 618. Optically detectable pattern 620b is configured to generate an electrical output signal at encoder port B, which is a sine wave having 100 waveform cycles per revolution of disc 618. Indexing aperture 620c is configured to generate a trigger pulse at encoder port C, at the completion of each revolution of disc 618. Use of the trigger pulse will be described below.

Figure 14:
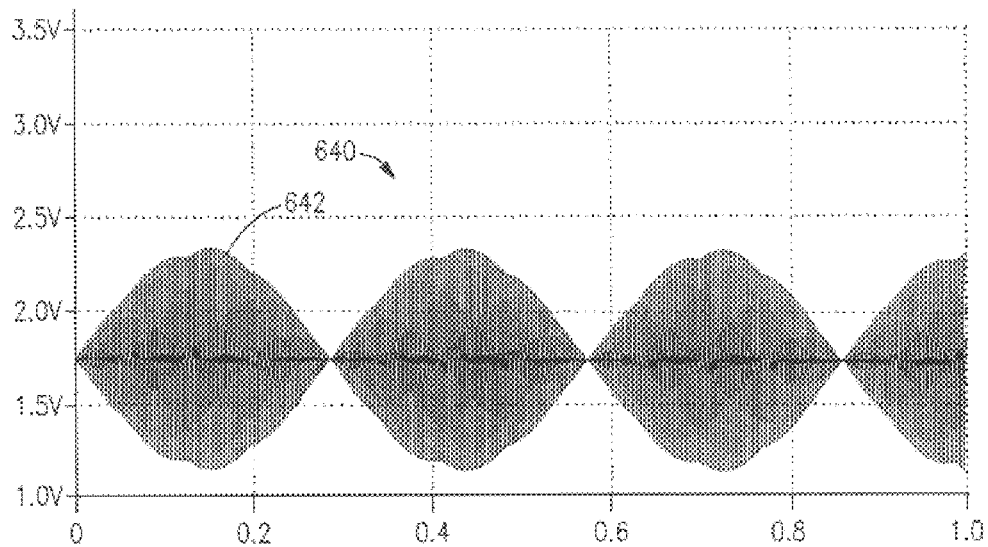
FIG. 14 is a plot of a resultant output signal produced by the waveform combining technique of FIG. 13.

The 96.5 cycle sine wave is combined with the 100 cycle sine wave in pot 630, and a resultant output signal 640 (See FIG. 14) is produced on wiper 631. A plot of resultant output signal 640 is shown in FIG. 14. The plot shows signal 640 over one complete revolution of encoder disc 618. Signal 640 includes a dominant waveform component 642 having 3.5 waveform cycles over one revolution of encoder disc 618. Note, the number of cycles of component 642 (i.e., 3.5) is equal to the difference between the 100 and 96.5 cycles of the two encoder signals. The combining process that takes place in pot 630 yields waveform components that have a number of cycles equal to the difference, the sum, and a series of harmonics of the cycles of the two encoder signals.

Since the two encoder signals are of different frequencies, they are out of phase with each other, and a progressive phase shift results between the two signals. Constructive and destructive interference (i.e., vector summing and subtracting) of the two signals occurs when they are combined, thus producing a resultant signal with a number of periodic waveform components whose rate (cycles per revolution or "CPR") is related to the progressive phase shift.

As will be illustrated below, the shape, and the cycle count per revolution, of the resultant waveform components can be altered by changing the phase relationship between the two encoder output signals. In addition, the shape of the resultant waveform components can be altered by combining encoder signals having differently shaped waveforms (e.g., combining a trapezoidal wave with a sine wave—See FIG. 12B), or by combining a non-uniform waveform (FIG. 7B) with a uniform waveform (FIG. 4B) or with another non-uniform waveform (FIG. 12B). Accordingly, the present invention is not limited to the sine wave example of FIGS. 13, 14.

Moreover, the present invention is not limited to direct encoder-disc generation of the encoder output signals. For example, encoder 610 could be configured to produce one or both of the encoder signals by merely varying (or modulating) the light output of emitters 620a and/or 620b, as will be described hereinbelow.

Referring back to FIG. 13, lowpass filter 632 is designed to select frequencies derived from waveform component 642. Since filter 632 is a frequency-based device (i.e., cycles per second—not cycles per encoder disc revolution), its pass band will be determined by multiplying the desired number of waveform cycles per revolution (e.g., 3.5) by the normal operating speed of motor 600 (e.g., 1,050 rpm or 17.5 rps). Thus, the desired 3 dB bandwidth for filter 632 is 61.25 Hz, which is sufficient to pass all frequencies derived from waveform component 642 and reject the frequencies derived from the "sum" and harmonic waveform components, over the entire range of 0 to 1,050 RPMs. The signal produced at the output of filter 632 has a frequency (or frequencies) which is derived from waveform component 642 (having the 3.5 CPR relationship).

Amplifier stage 634 includes an analog switch 646 which has an analog input for receiving the filtered signal from filter 632 and a clock input for receiving the trigger pulse from encoder output port C. Stage 634 also includes a power amplifier 648 and an inverting power amplifier 649, the inputs of which are connected to switch 646 and the outputs of which are tied together at node D. Under control of the trigger pulse, switch 646 switches the filtered output of filter 632 alternately between amplifier 648 and 649 (every revolution of encoder disc 618). This arrangement is necessary to avoid a 180° phase discontinuity in the filtered signal every revolution of encoder disc 618. The signal at node D is a continuous analog sine wave having a frequency that varies from 0 to 61.25 Hz, over the operating range of motor 600 (0 to 1,050 RPMs), and has a voltage level sufficient to drive motor 600.

More than one filter (e.g., at least one bandpass filter) may be employed to select other specific waveform components of the resultant output signal (i.e., the band of frequencies derived from such components).

Referring now to FIGS. 13 and 15–18, an alternative embodiment for generating a resultant output signal from two encoder signals will now be described. In this example, encoder disc 618 is configured in the same way as in the previous example, except optically detectable pattern 620a is configured to generate a signal at port A which is a sine wave having 193 waveform cycles per revolution of disc 618. Also in this example, the analog circuitry comprising pot 630, filter 632, and amplifier stage 634, is replaced with the circuitry shown in FIG. 15. Otherwise, encoder 610 operates in the same manner as in the previous example.

Figure 15:
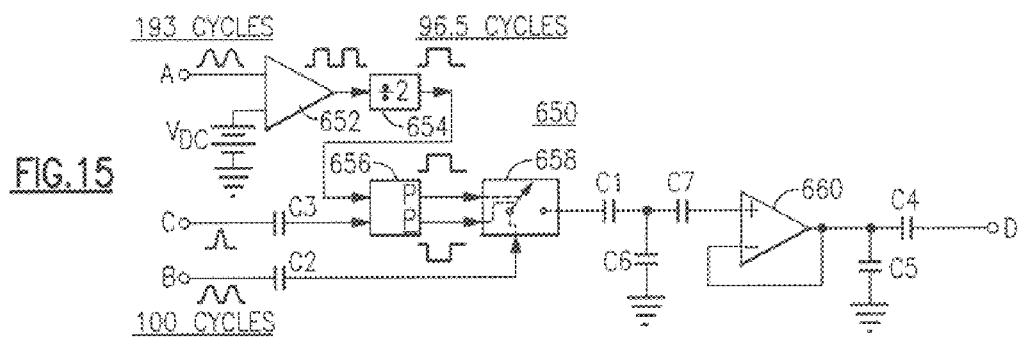
FIG. 15 is a schematic diagram of another embodiment of the electrical waveform combining technique of the present invention.

Referring now to FIG. 15, a waveform combining network 650 includes three input ports A, B and C, and an output port D. Input ports A, B and C are connected to encoder output ports A, B and C, respectively (See FIG. 13). Output port D of network 650 is coupled to input terminal d of motor 600, via a variable gain power amplifier (not shown). Thus, the amplified output of network 650 is intended to drive motor 600.

As shown in FIG. 15, a comparator 652 has a reference voltage $V_{DC}$ at one input and the sine wave signal from encoder port A at the other input. Comparator 652 converts the sine wave to a square wave having the same frequency ("digitizes" it). The sine wave may be replaced with a series of pulses generated directly from a differently configured optically detectable pattern 620a—a track containing 193 slot apertures ("lines"). In either case, the signal from port A will be digitized (or sharpened) by comparator 652, to form a square wave. Next, a digital divider 654 receives the digitized signal and divides its frequency in half. The output of divider 654 is a square wave, modified to have narrow pulses, and having 96.5 cycles per rev. of encoder disc 618. Divider 654 may be a counter IC configured for a divide-by-two ("/2") function.

The output of divider 654 is connected to the primary input of a digital inverter 656, and encoder port C is coupled to the toggle input of inverter 656 via a coupling capacitor C3. The square wave from divider 656 toggles between a non-inverted and inverted state at outputs P and P̲ of inverter 656, respectively, on each trigger pulse received from encoder 610. The outputs P,P̲ of inverter 656 are connected to the control inputs of an analog switch 658 (e.g., a MAXIM DG418 N.O.). The square wave from inverter 656 ("the mixing signal") causes switch 658 to switch at a rate of 96.5 times per encoder revolution. The encoder signal from encoder port B (100 CPR) is coupled to the analog signal input of switch 658 via coupling capacitor C2. The 100 cycle encoder signal ("the base analog signal") is then sampled in switch 658, at the 96.5 rate, and the samples are presented at the output of switch 658. The samples are integrated or smoothed together by the capacitive circuit C6 and C7, to produce a periodic resultant output signal having a 3.5 CPR rate (100–96.5). The resultant signal is then passed through an op amp 660 (configured as a voltage follower) and capacitive circuit C5 and C4, for further smoothing of the signal. The resultant signal is then amplified (not shown) and applied to input terminal d of motor 600, to drive motor 600.

Figure 16:
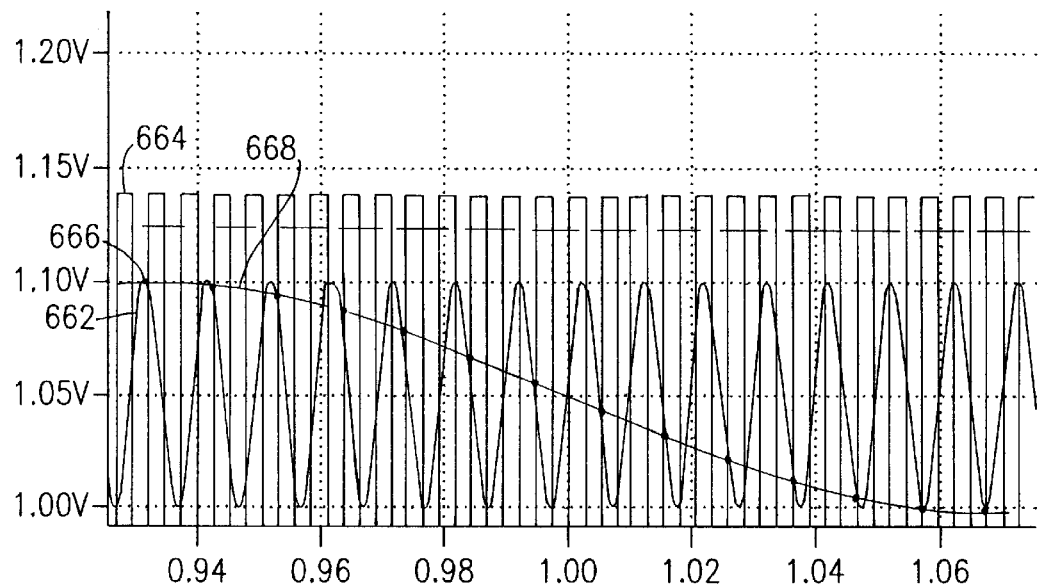
FIGS. 16–18 are plots of various resultant output signals produced by the waveform combining technique of FIG. 15.

Referring now to FIG. 16, a plot is shown of the analog base signal (662) superimposed on the square wave output (664) of comparator 652, over a portion of one revolution of encoder disc 618. Sample points 666 of base signal 662 are spaced every two cycles of square wave 664, because sampling is at the 96.5 rate. Sampling occurs at the crossover points of base signal 662 and the leading edge of every other cycle of square wave 664. Note, due to the progressive phase shift between the signals, sample points 666 progressively shift through base signal 662. It is this progressive sampling that produces the resultant 3.5 cycle signal (668).

From FIG. 16, it can be understood that if square wave signal 664 is inverted, sample points 666 would shift by 180°, causing the resultant output signal to be shifted by 180° (or inverted). This principle is employed in network 650 (FIG. 15) to correct for a 180° phase discontinuity that would occur each revolution in a resultant signal having 3.5 CPR (or any half-cycle rate). Referring back to FIG. 15, digital inverter 656 inverts the 96.5 mixing signal every other revolution of encoder disc 618, in response to the trigger pulse from port C. During these intervals, the analog base signal is sampled with the inverted mixing signal, and the resulting output signal at node D is inverted. Thus, a continuous resultant signal is produced over successive revolutions of encoder disc 618 (in this case, 7 whole cycles every two revolutions).

It should be noted that any appropriate combination of waveform cycles can be used to produce a resultant number of waveform cycles. Divider 654 can be configured to divide by ½, ¼, ⅛, etc., in order to obtain any desired non-integer number of cycles. Higher numbers of cycles in the base and digital signals will provide more sampling points, and hence produce a finer resolution output signal. The base analog signal does not have to be a sine wave, nor does it have to be constant in frequency or phase throughout the entire encoder revolution, nor does its waveform have to be uniform.

Figure 17:
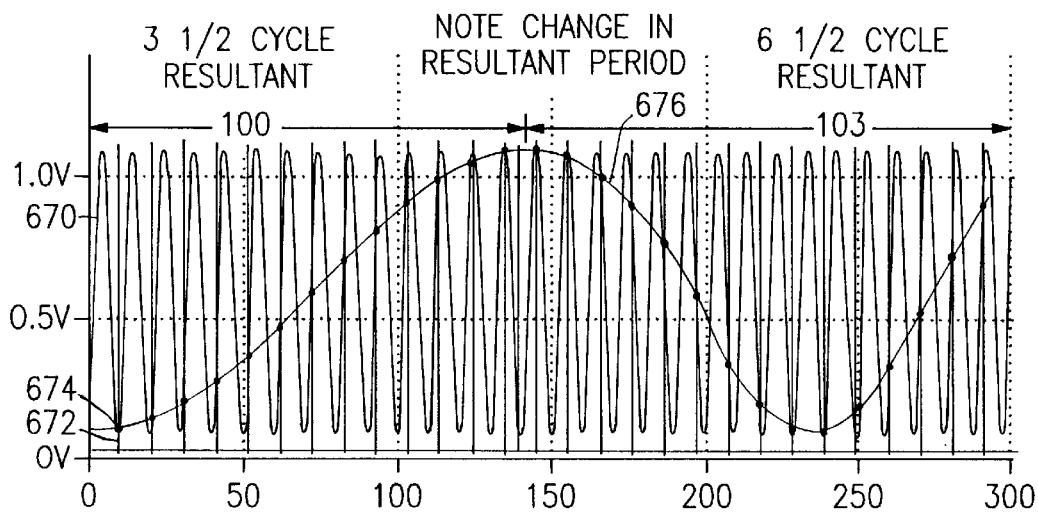
Figure 18:
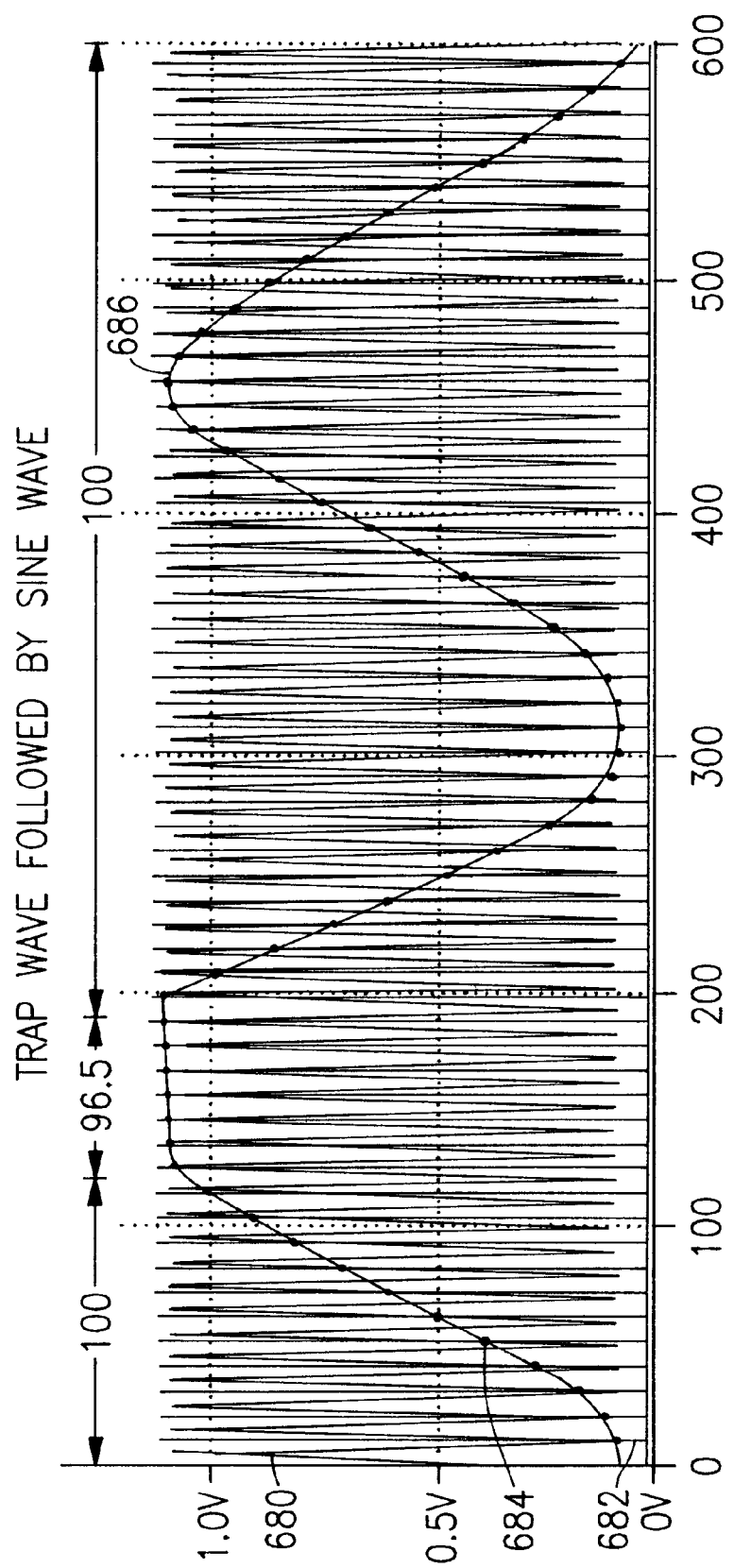

Some of these variations are illustrated in the plots shown in FIGS. 17 and 18. In FIG. 17, an analog base signal 670 is sampled by a divided digital mixing signal 672, having 96.5 CPR. (In the plots of FIGS. 17 and 18, only the leading edge of the digital signal is shown.) Sample points 674 occur at the cross-over point of the leading edge of digital signal 672 and analog base signal 670. Base signal 670 changes in frequency between a 100 CPR and a 103 CPR rate, during every revolution of encoder disc 618. Note that the resultant signal (676) follows base signal 670 in a change in frequency—from a 3.5 to 6.5 CPR rate.

In FIG. 18, an analog base signal 680 is sampled by a divided mixing signal 682, having 96.5 CPR. Sample points 684 define a resultant signal 686. Base signal 680 changes from 100 CPR, to 96.5 CPR, and back to 100 CPR, during every revolution of encoder disc 618. Note that the waveform of resultant signal 686 has a trapezoidal shape followed by a sine wave shape.

From these examples it is apparent that by varying the CPR rate of the base analog signal in relation to the digital signal, any resultant wave shape or frequency can be achieved. Moreover, the analog signal, the digital signal, or both can be varied as needed. The amplitude of the resultant signal also may be varied by varying the amplitude of the base signal. The amplitude of the base wave can be varied, for example, by graphically programming encoder disc 618 and mask 622, or by varying the light intensity of emitters 614. Whatever the means, it is evident that varying the base analog/digital relationship enables the encoder to produce any desired resultant waveform output.

All of the above described waveform mixing or combining techniques are particularly suited for producing waveforms having a non-integer number of waveform cycles per encoder revolution. Such waveforms are desirable to compensate for frequency slip in A.C. induction motors.

Figure 19:
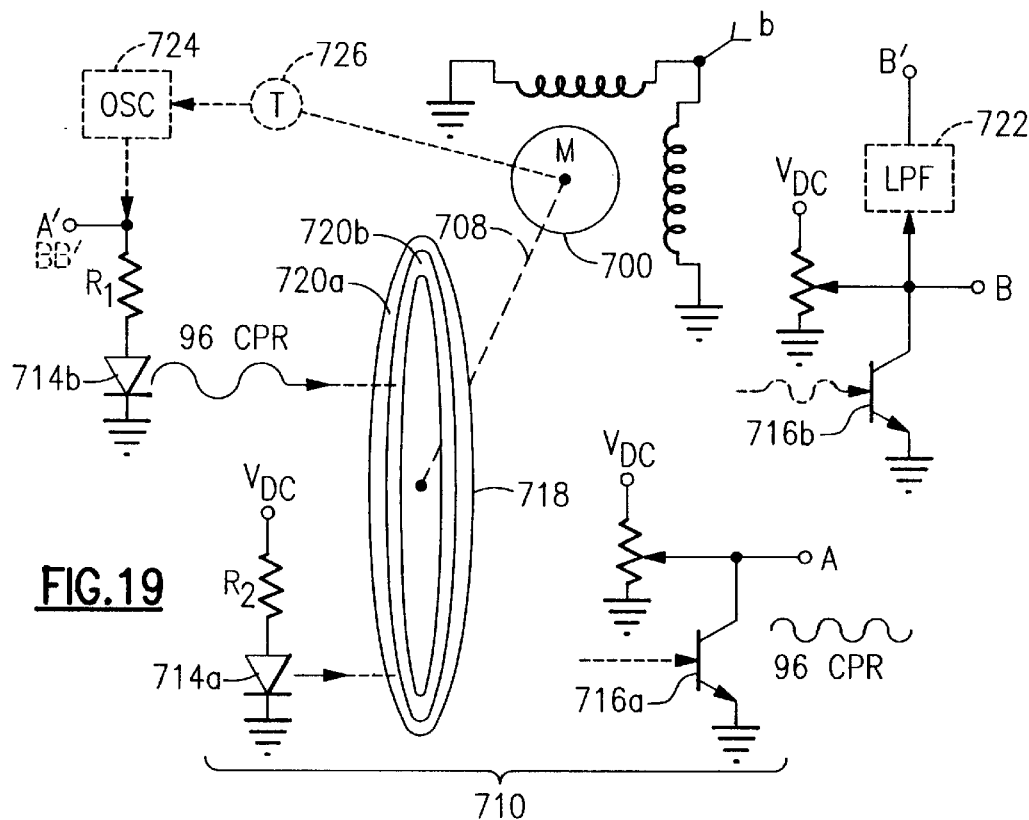
FIG. 19 is a schematic representation of an optical programming technique of the present invention, wherein radiant energy output of an emitter is varied as a function of time to produce a resultant output signal.

Referring now to FIG. 19, another aspect of optical programming will be described. In addition to (or as an alternative to) graphical programming, the radiant energy output level of at least one of the encoder's emitters can be varied as a function of time. Very similar results can be achieved using this technique as are achieved with the waveform combining technique described above.

In the example shown in FIG. 19, a motor 700 has a two-channel encoder 710 coupled to its rotor shaft 708 in the same manner as the embodiment shown in FIG. 13. Motor 700 is the same A.C. induction motor as motor 600. Encoder 710 includes two infrared LED emitters 714*a* and 714*b*, which emit infrared energy along optical paths between the emitters and a corresponding number of photo-transistors 716*a*–*b*. Encoder 710 includes an optical encoder disc 718 which rotates with shaft 708. Disc 718 contains two optically detectable graphical patterns 720*a* and 720*b*. Encoder 710 may further include a mask containing two apertures (not shown) which are aligned with patterns 720*a* and 720*b*, respectively, along the optical paths.

Optically detectable pattern 720*a* is configured to generate a sine wave signal at the output of photo-transistor 716*a*, having 96 cycles per revolution of encoder disc 718, in response to a constant emitter source. In this example, emitter 714*a* is a constant IR emitter source. The 96 CPR encoder signal is then coupled to the A' terminal of emitter 714*b*, and serves as an A.C. power source for emitter 714*b*. The encoder signal may be amplified, if necessary, before being applied to emitter 714*b*.

The 96 CPR encoder signal causes emitter 714*b* to emit IR energy in a sinusoidal manner. Emitter 714*b* must have a sufficient response time and a suitable transfer characteristic to accurately translate the 96 electrical cycles (per rev.) into corresponding IR energy waves. The IR energy waves are modified as they pass through pattern 720*b* which is scanning relative to photo-transistor 716*b*. The modified IR waves are then directed to photo-transistor 716*b* for detection. Pattern 720*b* is configured to produce a sine wave encoder signal at the output of photo-transistor 716*b*, having 100 cycles per revolution of encoder disc 718 (assuming a constant emitter sources). However, the modified IR waves produce a resultant or application signal at the output of photo-transistor 716*b* which is a combination of the 96 CPR and 100 CPR sine wave signals. The resultant signal contains the same waveform components as if the 96 CPR and 100 CPR signals were combined electrically, as in FIG. 13.

A low pass filter 722 may be employed to select the frequencies of the resultant signal which are derived from the "difference" waveform—a sine wave having 4 cycles per revolution. The filtered output B' may then be amplified and applied to the input terminal b of motor 700, to drive motor 700. Similarly, a "difference" waveform having 3.5 cycles per revolution can be generated if pattern 720*a* is configured to generate a 96.5 CPR output signal. In such case, additional analog output circuitry, such as amplifier stage 634 in FIG. 13, and a trigger pulse derived from encoder disc 718, may be needed to correct for the 180° discontinuity inherent in a 3.5 cycle embodiment.

It is to be understood that the embodiment in FIG. 19 is only one example of the technique of varying the emitter output as a function of time. In another embodiment, the resultant signal at output B of photo-transistor 716b, or the signal at output B', may be coupled to emitter 714b. The resultant signal may be filtered to select frequencies which are derived from a desired waveform component, before being coupled to emitter 714b. In a further embodiment, the resultant signal (or a filtered version thereof) may be coupled to another variable output emitter (not shown) to drive another encoder channel.

Moreover, an oscillator, oscillating circuit, waveform generator, etc. (referenced in FIG. 19 by numeral 724) may be utilized to vary the output of emitter 714b. In such case, oscillator 724 may be synchronized by tachometer or position sensing signals from a tachometer or shaft encoder 726. Of course, combinations of all of the above-mentioned techniques may be employed.

Figure 20:
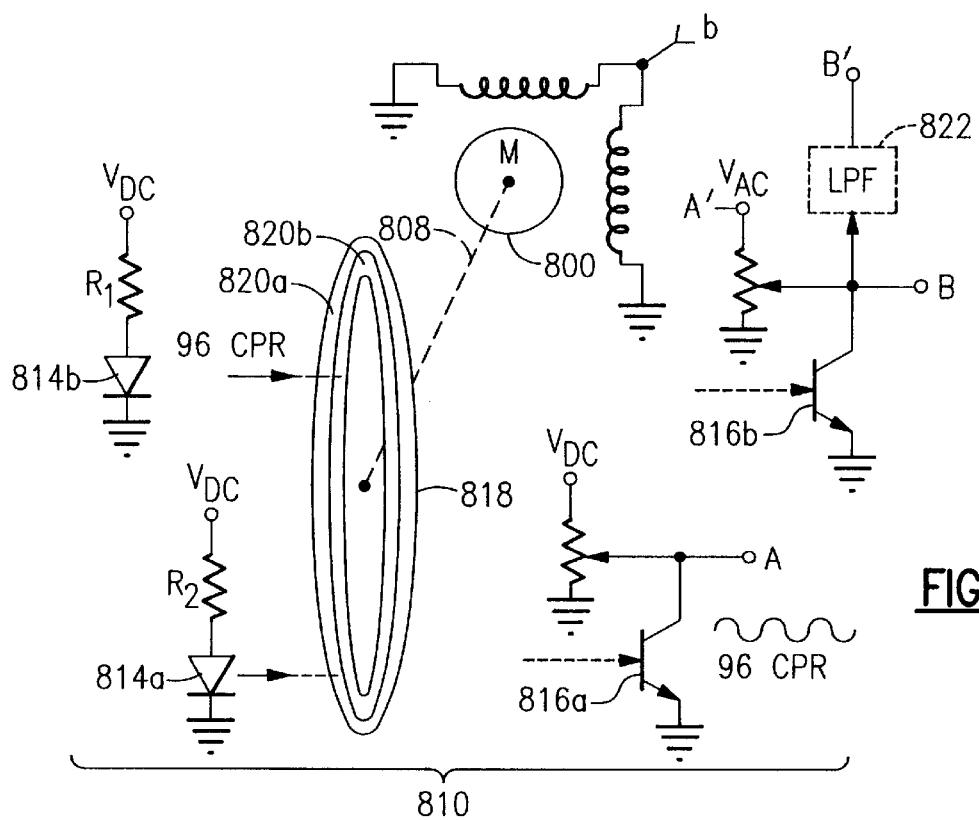
FIG. 20 is a schematic representation of an optical programming technique of the present invention, wherein the output characteristic of a photo-detector is varied as a function of time to produce a resultant output signal.

Referring now to FIG. 20, a further aspect of optical programming will be described. Here, the supply voltage to the photo-transistor detector(s) in the encoder is varied as a function of time. Very similar results can be achieved using this technique as are achieved with the waveform combining technique described above.

In the example shown in FIG. 20, a motor 800 has a two-channel encoder 810 coupled to its rotor shaft 808 in the same manner as the embodiment shown in FIG. 19. Motor 800 is the same A.C. induction motor as motor 700. Encoder 810 includes two constant source, infrared LED emitters 814a and 814b which emit along optical paths between the emitters and a corresponding number of photo-transistors 816a–b. Encoder 810 includes an encoder disc 818 which rotates with shaft 808. Disc 818 contains two optically detectable patterns 820a, 820b, which are configured in the same way as patterns 720a, 720b, respectively.

A 96 CPR encoder signal is generated at an output A of photo-transistor 816a, and is then coupled to a power supply terminal A' of photo-transistor 816b. The 96 CPR signal (which may need to be amplified) serves as an A.C. power source for photo-transistor 816b. The 96 CPR encoder signal causes photo-transistor 816b to vary its output response in a sinusoidal manner. The operating characteristic of photo-transistor 816b must be sufficiently linear over the voltage swing of the 96 CPR signal to accurately follow the signal at its output (output B).

Pattern 820b is configured to produce a 100 CPR sine wave signal at the output of photo-transistor 816b. However, because photo-transistor 816b is powered by the 96 CPR signal (which causes the output of photo-transistor 816b to vary sinusoidally), a resultant or application signal is produced at output B which is a combination of the 96 CPR and 100 CPR sine wave signals. The resultant signal contains the same waveform components as if the 96 CPR and 100 CPR signals were combined electrically, as in FIG. 13. A low pass filter 822 may be employed to select the frequencies of the resultant signal which are derived from the "difference" waveform—a sine wave having 4 cycles per revolution. The filtered output B' may then be amplified and applied to the input terminal b of motor 800, to drive motor 800.

While the preferred embodiments of the invention have been particularly described in the specification and illustrated in the drawings, it should be understood that the invention is not so limited. Many modifications, equivalents and adaptations of the invention will become apparent to those skilled in the art without departing from the spirit and scope of the invention, as defined in the appended claims.

What I claim is:

1. A method of generating a resultant output signal from an encoder of the type that converts cyclic motion of an electro-mechanical machine into at least one electrical output signal, said method comprising the steps of:
    (a) generating a first output signal from said encoder, said first output signal having a first number of waveform cycles per mechanical cycle of said encoder;
    (b) generating a second output signal from said encoder, said second output signal having a second number of waveform cycles per mechanical cycle of said encoder;
    (c) combining said first output signal with said second output signal to produce said resultant output signal, said resultant output signal including a resultant number of waveform cycles per mechanical cycle of said encoder, the resultant number of waveform cycles being determined by the first and the second number of waveform cycles of said first and said second output signals; and
    (d) selecting the resultant number of waveform cycles from said resultant output signal to produce a third output signal having the resultant number of waveform cycles per mechanical cycle of said encoder.

2. A method of generating a resultant output signal from an encoder of the type that converts cyclic motion of an electro-mechanical machine into at least one electrical output signal, said method comprising the steps of:
    (a) generating a first output signal from said encoder, said first output signal having a first number of waveform cycles per mechanical cycle of said encoder;
    (b) generating a second output signal from said encoder, said second output signal having a second number of waveform cycles per mechanical cycle of said encoder;
    (c) sampling said first output signal a number of times per mechanical cycle of said encoder, the number of samples being determined by the number of waveform cycles of said second output signal; and
    (d) producing said resultant output signal from the samples of said first output signal, said resultant output signal including a resultant number of waveform cycles per mechanical cycle of said encoder, the resultant number of waveform cycles being determined by the first and the second number of waveform cycles of said first and said second output signals.

3. The method as recited in claim 2, wherein the number of waveform cycles of said second output signal is an odd number and the number of waveform cycles of said first output signal is a whole number, and wherein said step (c) includes
    dividing the number of waveform cycles of said second output signal by a number which yields a non-integer number, and
    sampling said first signal a number of times equal to the non-integer number, per mechanical cycle of said encoder,
    whereby the resultant number of waveform cycles of said resultant output signal is a non-integer number.

4. A method of generating an electrical application signal from an encoder of the type that converts cyclic motion of an electro-mechanical machine into at least one electrical output signal, said method comprising the steps of:
    (a) generating a first electrical output signal from the encoder, said first output signal having a number of waveform cycles per mechanical cycle of the encoder;

(b) coupling the first output signal to a radiant energy emitter;

(c) varying the radiant energy output of the emitter as a function of the first output signal;

(d) coupling varying radiant energy from the emitter to a detector; and (e) using said detector to detect the coupled radiant energy and generate the electrical application signal therefrom, said application signal including a number of waveform cycles per mechanical cycle of the encoder, the number of waveform cycles of the application signal being a function of the number of waveform cycles of the first output signal.

5. The method as recited in claim 4, wherein said step of coupling the varying output of the emitter to a detector, includes modifying the varying output of the emitter with an optically detectable pattern which scans relative to the detector in accordance with the cyclic motion of the machine, and coupling the modified varying output of the emitter to said detector, whereby the number of waveform cycles of the application signal, per mechanical cycle of the encoder, is a function of the number of waveform cycles of the first output signal and the optically detectable pattern.

6. The method as recited in claim 4, further comprising the step of coupling the application signal to the emitter.

7. The method as recited in claim 4, further comprising the step of coupling the application signal to another radiant energy emitter.

8. the method as recited in claim 5, wherein the optically detectable pattern is associated with the encoder and is adapted to generate a second electrical output signal, said second output signal having a number of waveform cycles per mechanical cycle of the encoder, whereby the number of waveform cycles of the application signal is a function of the number of waveform cycles of the first and the second output signals.

9. A method of generating an electrical application signal from an encoder of the type that converts cyclic motion of an electro-mechanical machine into at least one electrical output signal, said method comprising the steps of:

(a) generating a first electrical output signal from the encoder, said first output signal having a number of waveform cycles per mechanical cycle of the encoder;

(b) coupling the first output signal to a radiant energy detector;

(c) varying the output of the detector as a function of the first output signal; and (d) generating the electrical application signal from the varying output of the detector, said application signal including a number of waveform cycles per mechanical cycle of the encoder, the number of waveform cycles of the application signal being a function of the number of waveform cycles of the first output signal.

10. The method as recited in claim 9, wherein said step of varying the output of the detector further includes modifying the varying output of the detector with an optically detectable pattern which scans relative to the detector in accordance with the cyclic motion of the machine, and whereby the number of waveform cycles of the application signal, per mechanical cycle of the encoder, is a function of the number of waveform cycles of the first output signal and the optically detectable pattern.

11. The method as recited in claim 10, wherein the optically detectable pattern is associated with the encoder and is adapted to generate a second electrical output signal, said second output signal having a number of waveform cycles per mechanical cycle of the encoder, whereby the number of waveform cycles of the application signal is a function of the number of waveform cycles of the first and the second output signals.

12. An apparatus for generating a resultant output signal from a plurality of encoder output signals, said apparatus comprising:

(a) an encoder of the type that converts cyclic motion of an electro-mechanical machine into first and second electrical output signals, the first signal having a first waveform cycle rate and the second signal having a second waveform cycle rate; and (b) means, coupled to said encoder, for applying the first output signal to the second output signal to produce said resultant output signal, said resultant output signal having a resultant waveform cycle rate which is determined by and is different from the first and the second waveform cycle rates of the first and the second output signals, wherein said encoder has first and second output leads on which the first and the second output signals are presented, respectively, and wherein said applying means is a potentiometer connected across the first and the second output leads of said encoder, said potentiometer having a wiper output, the first output signal being combined with the second output signal in said potentiometer and the resultant output signal being produced at the wiper output of said potentiometer.

13. An apparatus for generating a resultant output signal from a plurality of encoder output signals, said apparatus comprising:

(a) an encoder of the type that converts cyclic motion of an electro-mechanical machine into first and second electrical output signals, the first signal having a first waveform cycle rate and the second signal having a second waveform cycle rate;

(b) means, coupled to said encoder, for applying the first output signal to the second output signal to produce said resultant output signal, said resultant output signal having a resultant waveform cycle rate which is determined by the first and the second waveform cycle rates of the first and the second output signals; and (c) a filter coupled to said applying means to receive and filter said resultant output signal, said filter being configured to select frequencies which relate to the resultant waveform cycle rate of said resultant signal, whereby said filter produces a filtered output signal from said resultant signal having frequencies which relate to the resultant waveform cycle rate.

14. The apparatus of claim 13, further comprising an amplifier coupled to said filter to receive and amplify the filtered output signal.

15. The apparatus of claim 13, further comprising:

(d) a switch having an analog input coupled to said filter for receiving the filtered output signal and a trigger input coupled to said encoder for receiving a trigger signal generated every mechanical cycle of said encoder, said switch further including first and second outputs, the trigger signal causing said switch to switch the filtered output signal between the first and the second outputs of said switch every mechanical cycle of said encoder;

(e) a non-inverting amplifier coupled to the first output of said switch and having a non-inverting output; and (f) an inverting amplifier coupled to the second output of said switch and having an inverting output, the filtered output signal being amplified by said non-inverting and said inverting amplifiers, alternately, by operation of said switch, whereby the amplified filtered output signal is inverted for one mechanical cycle of said encoder and non-inverted for a contiguous mechanical cycle of said encoder.

16. An apparatus for generating a resultant output signal from a plurality of encoder output signals, said apparatus comprising:

(a) an encoder of the type that converts cyclic motion of an electro-mechanical machine into first and second electrical output signals, the first signal having a first waveform cycle rate and the second signal having a second waveform cycle rate; and (b) means, coupled to said encoder, for applying the first output signal to the second output signal to produce said resultant output signal, said resultant output signal having a resultant waveform cycle rate which is determined by the first and the second waveform cycle rates of the first and the second output signals, said applying means including a signal sampling circuit which samples the first output signal at a sample rate to produce signal samples, the sample rate being related to the second waveform cycle rate of the second output signal, and a signal smoothing circuit coupled to said sampling circuit for receiving the signal samples and producing said resultant output signal therefrom.

17. The apparatus of claim 16, wherein said signal sampling circuit includes an analog input coupled to said encoder for receiving and sampling the first output signal, said sampling circuit further including a sampling input coupled to said encoder for receiving a mixing signal, the mixing signal causing said sampling circuit to sample the first output signal at a rate proportional to a frequency of the mixing signal and to produce signal samples, the frequency of the mixing signal being derived from the second waveform cycle rate of the second output signal.

18. The apparatus of claim 17, wherein said applying means further includes an inverter having a primary input coupled to said encoder for receiving the mixing signal and a toggle input coupled to said encoder for receiving a trigger signal generated every mechanical cycle of said encoder, said inverter further including inverting and non-inverting outputs coupled to the sampling input of said sampling circuit, the mixing signal being toggled between the inverting and non-inverting outputs in inverted and non-inverted states, respectively, on each trigger signal received at the toggle input.

19. The apparatus of claim 18, wherein said applying means further includes a frequency divider, having an input coupled to said encoder for receiving a digitized signal which is derived from the second encoder output signal, and having an output coupled to the primary input of said inverter, wherein said divider divides the frequency of the digitized signal by a given number to produce the mixing signal and presents the mixing signal at the output of said divider for transmission to said inverter.

20. An apparatus for generating a resultant output signal from the cyclic motion of an electro-mechanical machine, said apparatus comprising:

(a) an encoder that converts the cyclic motion of the electro-mechanical machine into a first electrical output signal and presents the first output signal at a first encoder output, the first output signal having a first waveform cycle rate;

(b) an emitter having a radiant energy output that varies in accordance with an electrical power input, said emitter being coupled to the first encoder output such that the radiant energy emitted by said emitter varies in accordance with the first waveform cycle rate of the first output signal; and (c) a radiant energy detector, optically coupled to said emitter, for converting varying radiant energy from said emitter into the resultant output signal, the resultant signal having a resultant waveform cycle rate that is a function of the first waveform cycle rate of the first output signal.

21. The apparatus of claim 20, further comprising an optical element, containing an optically detectable pattern which is optically coupled to said emitter and said detector, said optical element being configured to scan the pattern, relative to said detector, in accordance with the cyclic motion of the machine, wherein said pattern modifies the variable radiant energy output of said emitter as the pattern scans, the resultant output signal being produced by said detector in response to the modified variable radiant energy output, whereby the resultant waveform cycle rate of the resultant output signal is a function of the first waveform cycle rate and the optically detectable pattern.

22. The apparatus of claim 21, wherein the optically detectable pattern of said optical element is configured to produce a hypothetical output signal having a hypothetical waveform cycle rate, whereby the resultant waveform cycle rate of the resultant output signal is related to the first waveform cycle rate and the hypothetical waveform cycle rate.

23. The apparatus of claim 21, further comprising a filter coupled to the output of said detector to receive and filter said resultant signal, said filter being configured to select frequencies which relate to the resultant waveform cycle rate of said resultant signal, whereby said filter produces a filtered output signal, from said resultant signal, having frequencies which relate to the resultant waveform cycle rate.

24. The apparatus of claim 20, wherein said resultant signal produced by said detector is coupled to said emitter.

25. The apparatus of claim 20, further comprising another radiant energy emitter, said resultant signal being coupled to said other radiant energy emitter.

26. An apparatus for generating a resultant output signal from the cyclic motion of an electro-mechanical machine, said apparatus comprising:

(a) first and second radiant energy emitters, said second emitter having a radiant energy output that varies in accordance with an electrical power input;

(b) first and second radiant energy detectors optically coupled to said first and second emitters, respectively; and (c) first and second optically detectable patterns optically coupled to said first and second emitters respectively, and to said first and second detectors, respectively, said first and second patterns being made to scan relative to said first and second detectors, respectively, over a scan cycle, in accordance with the cyclic motion of the machine, the first pattern modifying the radiant energy output of said first emitter as said first pattern scans over the scan cycle, such that a first periodic output signal is produced by said first detector, the first signal having a first waveform cycle rate, said second emitter being electrically coupled to said first detector such that the radiant energy emitted by said second emitter varies in accordance with the first waveform cycle rate of the first output signal, said second pattern modifying the varying radiant energy output of said second emitter, as said second pattern scans over the scan cycle, such that said resultant output signal is produced by said second detector, said resultant signal having a resultant waveform cycle rate that is a function of the first waveform cycle rate and said second pattern.

27. The apparatus of claim 26, wherein said second pattern is configured to produce a hypothetical output signal having a hypothetical waveform cycle rate, whereby the resultant waveform cycle rate of said resultant signal is a function of the first waveform cycle rate and the hypothetical waveform cycle rate.

28. An apparatus for generating a resultant output signal from the cyclic motion of an electro-mechanical machine, said apparatus comprising:

(a) means for converting the cyclic motion of the electro-mechanical machine into a first periodic electrical signal having a first waveform cycle rate;

(b) an emitter having a radiant energy output that varies in accordance with an electrical power input signal, said emitter being electrically coupled to said converting means such that the radiant energy emitted by said emitter varies in accordance with the first waveform cycle rate of the first periodic signal; and (c) a radiant energy detector, optically coupled to said emitter, for converting varying radiant energy from said emitter into said resultant output signal, said resultant signal having a resultant waveform cycle rate which is a function of the first waveform cycle rate.

29. The apparatus of claim 28, wherein said converting means includes—a tachometer coupled to the cyclic motion of the electro-mechanical machine, and an oscillator electrically coupled to said tachometer for producing the first periodic signal in synchronism with the cyclic motion of the machine.

30. The apparatus of claim 28, wherein said converting means includes an encoder mechanically coupled to the cyclic motion of the electro-mechanical machine.

31. The apparatus of claim 28, further comprising:

an optical element, containing an optically detectable pattern optically coupled to said emitter and said detector, said optical element being configured to scan the pattern, relative to said detector, in accordance with the cyclic motion of the machine, wherein said pattern modifies the variable radiant energy output of said emitter as the pattern scans, said resultant output signal being produced by said detector in response to the modified variable radiant energy output, whereby the resultant waveform cycle rate of said resultant output signal is a function of the first waveform cycle rate and the optically detectable pattern.

32. An apparatus for generating a resultant output signal from the cyclic motion of an electro-mechanical machine, said apparatus comprising:

(a) means for converting the cyclic motion of the electro-mechanical machine into a first periodic electrical signal having a first waveform cycle rate;

(b) a variable response detector having an output response that varies in accordance with an electrical power input signal, said detector being coupled to said converting means such that the output response of said detector varies in accordance with the first periodic signal; and (c) a radiant energy emitter, optically coupled to said detector, such that radiant energy from said emitter is detected by said detector, said detector generating said resultant output signal from the detected radiant energy and from the varying output response of said detector, said resultant signal having a resultant waveform cycle rate which is related to the first waveform cycle rate.

33. The apparatus of claim 32, wherein said converting means includes an encoder coupled to the cyclic motion of the electro-mechanical machine.

34. The apparatus of claim 32, further comprising an optical element, containing an optically detectable pattern optically coupled to said emitter and said detector, said optical element being configured to scan the pattern, relative to said detector, in accordance with the cyclic motion of the machine, wherein said pattern modifies the radiant energy emitted by said emitter as the pattern scans relative to the detector, whereby said resultant output signal produced by said variable response detector has a resultant waveform cycle rate which is a function of the first waveform cycle rate and of the optically detectable pattern.

35. The apparatus of claim 34, wherein the pattern of said optical element is configured to produce a hypothetical electrical output signal having a hypothetical waveform cycle rate, whereby said resultant output signal produced by said variable response detector has a resultant waveform cycle rate related to the first waveform cycle rate and the hypothetical waveform cycle rate.

36. An apparatus for generating a resultant output signal from the cyclic motion of an electro-mechanical machine, said apparatus comprising:

(a) first and second radiant energy emitters;

(b) first and second radiant energy detectors optically coupled to said first and second emitters, respectively, said second detector having an output response that varies in accordance with an electrical power input signal, (c) first and second optically detectable patterns optically coupled to said first and second emitters, respectively, and to said first and second detectors, respectively, said first and second patterns being made to scan relative to said first and second detectors, respectively, in accordance with the cyclic motion of the machine, the first pattern modifying the radiant energy output of said first emitter as said first pattern scans relative to said first detector, such that a first periodic output signal is generated by said first detector, said first output signal having a first waveform cycle rate, said second detector being coupled to said first detector such that the output response of said second detector varies in accordance with the first periodic signal;

said second pattern modifying the radiant energy output of said second emitter as said second pattern scans relative to said second detector, such that said resultant output signal is generated by said second detector, said resultant signal having a resultant waveform cycle rate that is a function of the first waveform cycle rate and said second pattern.

37. The apparatus of claim 36, wherein said second optically detectable pattern is configured to produce a hypothetical output signal having a hypothetical waveform cycle rate, whereby the resultant waveform cycle rate of said resultant output signal is related to the first waveform cycle rate and the hypothetical waveform cycle rate.

38. An apparatus for programming an electro-mechanical machine of the type that produces cyclic motion in response to at least one drive signal, said apparatus comprising:
  (a) encoder means for producing an encoder output signal in synchronism with the cyclic motion of the machine, said encoder means including
    (i) first and second graphically shaped patterns defined by a graphical function, said function being derived from a pre-determined drive signal having a desired waveform shape and cycle rate,
    (ii) means for supporting movement of said first pattern relative to said second pattern in accordance with the cyclic motion of the machine,
    (iii) source means for supplying energy to said first and said second patterns, said energy being modified by said first and second patterns, as said first pattern moves relative to said second pattern, to produce a combined encoder response, and
    (iv) means, having an output and an output response, for converting the combined encoder response to the encoder output signal, the encoder output signal being presented at the output of said converting means;
  (b) means for producing a second signal in synchronism with the cyclic motion of the machine; and
  (c) means for producing a resultant signal from the second signal and said encoder means, the resultant signal being in synchronism with the cyclic motion of the machine and having a waveform shape and cycle rate suitable for producing the predetermined drive signal.

39. The apparatus of claim 38, wherein said resultant signal means includes means, coupled to said source means and to said second signal means, for varying the energy supplied by said source means in accordance with the second signal, whereby the resultant signal is produced at the output of said converting means.

40. The apparatus of claim 38, wherein said resultant signal means includes means, coupled to said converting means and said second signal means, for varying the output response of said converting means in accordance with the second signal, whereby the resultant signal is produced at the output of said converting means.

41. The apparatus of claim 38, wherein said resultant signal means includes means, coupled to the output of said converting means and to said second signal means, for combining the second signal with the encoder output signal to produce the resultant signal.

42. The apparatus of claim 41, wherein the waveform cycle rate of said resultant signal is different than the waveform cycle rates of the second signal and the encoder output signal.

43. The apparatus of claim 38, further comprising means for producing the drive signal from said resultant signal.

44. The apparatus of claim 43, wherein said drive signal means includes amplification means for amplifying the resultant signal.

45. The apparatus of claim 43, wherein said drive signal means is an amplifier for amplifying the resultant signal to a level for driving the machine.

46. The apparatus of claim 38, wherein
  (i) said first and said second patterns are optically detectable patterns,
  (ii) said source means includes a radiant energy emitter optically coupled to said first and said second patterns, said combined encoder response being a combined optical response, and
  (iii) said converting means includes a photo-detector for converting the combined optical response to the encoder output signal.

47. The apparatus of claim 38, wherein said second signal means includes
  (i) third and fourth graphically shaped patterns defined by a second graphical function, said second function being derived from the pre-determined drive signal, said third pattern being supported for movement, in accordance with the cyclic motion of the machine, relative to said fourth pattern,
  (ii) second source means for supplying energy to said third and said fourth patterns, said energy being modified by said third and fourth patterns, as said third pattern moves relative to said fourth pattern, to produce a second combined encoder response, and
  (iii) means for converting the second combined encoder response to the second signal.

48. The apparatus of claim 47, wherein said third pattern is supported for movement by said supporting means for said first pattern, and wherein said supporting means includes a moveable encoder element, said encoder element containing said first and said third patterns.

49. The apparatus of claim 38, wherein said second signal is a digitized signal.

50. A method of programming an electro-mechanical machine of the type that produces cyclic motion in response to at least one drive signal, said method comprising the steps of:
  (a) providing an encoder having first and second graphically shaped patterns defined by a graphical function, said function being derived from a predetermined drive signal having a desired waveform shape and cycle rate;
  (b) moving the first pattern relative to the second pattern in accordance with the cyclic motion of the machine,
  (c) supplying energy to the first and the second patterns;
  (d) producing a combined encoder response as the energy is modified by the movement of the first pattern relative to the second pattern;
  (e) converting the combined encoder response to an encoder output signal;
  (f) producing a second signal in synchronism with the cyclic motion of the machine; and
  (g) producing a resultant signal from the second signal and said encoder, the resultant signal being in synchronism with the cyclic motion of the machine and having a waveform shape and cycle rate suitable for producing the predetermined drive signal.

51. The method of claim 50, wherein said step (g) includes varying the energy supplied to the first and the second patterns in accordance with the second signal, whereby the resultant signal is produced as the encoder output signal.

52. The method of claim 50, wherein said step (e) is carried out using a detector having an output response, and wherein said step (g) includes varying the output response of the detector in accordance with the second signal, whereby the resultant signal is produced as the encoder output signal.

53. The method of claim 50, wherein said step (g) includes combining the second signal with the encoder output signal to produce the resultant signal.

54. The method of claim 50, further comprising the step of producing the predetermined drive signal from said resultant signal.

55. A graphically programmed electric motor, comprising:

a stator assembly having a plurality of windings;

a rotor assembly having a shaft that rotates in response to a motor drive signal energizing the windings of said stator assembly;

a first encoder element containing a first graphically shaped detectable pattern positioned relative to the windings of said stator assembly;

a second encoder element containing a second graphically shaped detectable pattern, said second encoder element being coupled to the shaft of said rotor assembly such that the second graphically shaped pattern rotates in accordance with the rotation of the shaft, the first and second graphically shaped patterns being defined by a graphical function, said graphical function being derived from a predetermined motor drive signal having a desired waveform, the second graphically shaped pattern being operatively coupled to the first graphically shaped pattern to produce a combined encoder response as the shaft of said rotor assembly rotates relative to said stator assembly; and means for converting the combined encoder response into an encoder output signal which is synchronized with the rotational position of the shaft of said rotor assembly relative to the windings in said stator assembly, said encoder output signal having a waveform which is substantially the same as the desired waveform of the predetermined motor drive signal.

56. The electric motor of claim 55, further comprising amplification means, coupled to said converting means, for amplifying the encoder output signal to a desired level for energizing the windings of said stator assembly.

57. The electric motor of claim 55, wherein said second encoder element is coupled directly to the shaft of said rotor assembly.

58. The electric motor of claim 55, wherein the second graphically shaped pattern is arranged on said second encoder element in accordance with the positions of the poles in said motor.

59. The electric motor of claim 55, wherein the second graphically shaped pattern includes at least one graphically shaped cycle, and wherein the number of graphically shaped cycles in the second pattern is equal to or greater than the number of pole pairs in the motor.

60. The electric motor of claim 55, wherein said first and said second encoder elements are optical encoder elements and the combined encoder response is a combined optical response, and wherein said converting means is a photo-detector which converts the combined optical response into the encoder output signal.

61. The electric motor of claim 60, further comprising a radiant energy emitter, optically coupled to said first and said second optical encoder elements and said photo-detector, for directing a supply of radiant energy to said first and second encoder elements and said photo-detector to produce the combined optical response.

62. The electric motor of claim 55, wherein said first and said second encoder elements are magnetic encoder elements.

63. The electric motor of claim 55, wherein said first and said second encoder elements are capacitive encoder elements.

64. A programmed electric motor, comprising:

a stator assembly having a plurality of windings;

a rotor assembly having a shaft that rotates in response to a motor drive signal energizing the windings of said stator assembly;

a first encoder element containing a first graphically shaped detectable pattern positioned relative to the windings of said stator assembly;

a second encoder element containing a second graphically shaped detectable pattern, said second encoder element being coupled to the shaft of said rotor assembly such that said second pattern rotates in accordance with the rotation of the shaft, the first and second patterns being defined by a graphical function, said graphical function being derived from a predetermined motor drive signal having a desired waveform, the second pattern being operatively coupled to the first pattern to produce a combined encoder response as the shaft of said rotor assembly rotates relative to said stator assembly; and means for converting the combined encoder response into an encoder output signal which is synchronized with the rotational position of the shaft of said rotor assembly relative to the windings in said stator assembly, said encoder output signal having a waveform which is suitable for producing the desired waveform of the predetermined motor drive signal.

65. The electric motor of claim 64, further comprising means, coupled to said converting means, for producing the predetermined motor drive signal from said encoder output signal.

66. The electric motor of claim 65, wherein said means for producing the predetermined motor drive signal includes amplification means for amplifying the encoder output signal to a desired level for energizing the windings of said stator assembly.

67. The electric motor of claim 65, wherein said means for producing the predetermined motor drive signal includes means for generating a second encoder output signal which is synchronized with the rotational position of the shaft of said rotor assembly relative to the windings in said stator assembly, and means for combining said first encoder output signal with said second encoder output signal, to produce a resultant output signal having a waveform suitable for producing the desired waveform of the predetermined motor drive signal.

68. A method of programming an electric motor having a stator assembly and a rotor assembly, the stator assembly having a plurality of windings and the rotor assembly having a shaft that rotates in response to a motor drive signal energizing the windings of the stator assembly, said method comprising the steps of:

(a) positioning a first graphically shaped detectable pattern relative to the windings of the stator assembly;

(b) coupling an encoder element, containing a second graphically shaped detectable pattern, to the shaft of the rotor assembly, such that the second pattern rotates in accordance with the rotation of the shaft, the first and second patterns being defined by a graphical function, the graphical function being derived from a predetermined motor drive signal having a desired waveform;

(c) operatively coupling the second pattern to the first pattern, such that a combined encoder response is produced as the shaft of the rotor assembly rotates relative to the stator assembly; and (d) converting the combined encoder response into an encoder output signal which is synchronized with the rotational position of the shaft of the rotor assembly relative to the windings in the stator assembly, the encoder output signal having a waveform which is suitable for producing the desired waveform of the predetermined motor drive signal.

69. The method of claim 68, further comprising the step of:

(e) producing the predetermined motor drive signal from said encoder output signal.

* * * * *